US012212943B2

(12) United States Patent
Lee et al.

(10) Patent No.: US 12,212,943 B2
(45) Date of Patent: Jan. 28, 2025

(54) WIRELESS HEADSET

(71) Applicant: Huawei Technologies Co., Ltd., Guangdong (CN)

(72) Inventors: Fang-Ching Lee, Shenzhen (CN); Shijia Pi, Shenzhen (CN); Lin Lu, Shanghai (CN); Guofei Diao, Shanghai (CN); Zhonghua Wang, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 517 days.

(21) Appl. No.: 17/638,361

(22) PCT Filed: Jul. 16, 2020

(86) PCT No.: PCT/CN2020/102242
§ 371 (c)(1),
(2) Date: Feb. 25, 2022

(87) PCT Pub. No.: WO2021/036560
PCT Pub. Date: Mar. 4, 2021

(65) Prior Publication Data

US 2022/0295187 A1 Sep. 15, 2022

(30) Foreign Application Priority Data

Aug. 26, 2019 (CN) ......................... 201910790820.8

(51) Int. Cl.
*H04R 1/10* (2006.01)
*H04R 5/033* (2006.01)

(52) U.S. Cl.
CPC ........... *H04R 5/033* (2013.01); *H04R 1/1016* (2013.01); *H04R 1/1025* (2013.01);
(Continued)

(58) Field of Classification Search
CPC .. H04R 1/1016; H04R 1/1025; H04R 1/1075; H04R 5/033; H04R 2201/107; H04R 2410/07; H04R 2420/07
See application file for complete search history.

(56) References Cited

U.S. PATENT DOCUMENTS

| | | | | |
|---|---|---|---|---|
| 8,027,497 | B2 * | 9/2011 | Klemenz ................ | H04R 25/55 381/322 |
| 10,097,913 | B2 | 10/2018 | Rfer et al. | |

(Continued)

FOREIGN PATENT DOCUMENTS

| | | | |
|---|---|---|---|
| CN | 106551494 | A | 4/2017 |
| CN | 107277664 | A | 10/2017 |

(Continued)

*Primary Examiner* — Huyen D Le
(74) *Attorney, Agent, or Firm* — WOMBLE BOND DICKINSON (US) LLP

(57) ABSTRACT

This application provides a wireless headset, and relates to the field of TWS wireless headsets. The wireless headset includes a headset housing and a headset assembly accommodated in the headset housing. The headset assembly includes a microphone. The headset housing includes a bottom housing, the bottom housing includes a first bottom housing part and a second bottom housing part that are separated by using an insulating material, the first bottom housing part is a positive charging electrode, and the second bottom housing part is a negative charging electrode. A plurality of sound inlet holes are disposed on the bottom housing, and form microphone sound inlet channels communicating with each other. In the foregoing technical solutions, wind noise can be reduced, and call experience can be improved.

20 Claims, 14 Drawing Sheets

(52) U.S. Cl.
CPC ..... *H04R 1/1075* (2013.01); *H04R 2201/107* (2013.01); *H04R 2410/07* (2013.01); *H04R 2420/07* (2013.01)

(56) References Cited

U.S. PATENT DOCUMENTS

| | | | | |
|---|---|---|---|---|
| 2007/0263893 | A1* | 11/2007 | Kim | H04M 1/03<br>381/334 |
| 2016/0309249 | A1 | 10/2016 | Wu et al. | |
| 2017/0195770 | A1 | 7/2017 | Cheney et al. | |
| 2017/0347182 | A1* | 11/2017 | Chawan | H04R 1/1016 |

FOREIGN PATENT DOCUMENTS

| | | | |
|---|---|---|---|
| CN | 108632694 | A | 10/2018 |
| CN | 208783055 | U | 4/2019 |
| CN | 209088940 | U | 7/2019 |
| CN | 110166866 | A | 8/2019 |
| CN | 209218390 | U | 8/2019 |
| CN | 110519671 | A | 11/2019 |

* cited by examiner

WIRELESS HEADSET

CROSS-REFERENCE TO RELATED APPLICATIONS

This is a National Stage of International Patent Application No. PCT/CN2020/102242 filed on Jul. 16, 2020, which claims priority to Chinese Patent Application No. 201910790820.8 filed on Aug. 26, 2019. Both of the aforementioned applications are hereby incorporated by reference in their entireties.

TECHNICAL FIELD

This application relates to the field of headset technologies, and specifically, to a wireless headset.

BACKGROUND

Wireless headsets may communicate with a terminal device by using a wireless communication technology (for example, a Bluetooth technology, an infrared radio frequency technology, a 2.4G wireless technology, and an ultrasonic wave). Compared with wired headsets, the wireless headsets are rapidly developed because the wireless headsets get rid of a limitation of a physical cable and are more convenient to use. A left headset of the wireless headsets may also be connected to a right headset through Bluetooth.

The wireless headset is generally equipped with an independent charging case. When the wireless headset needs to be charged, the wireless headset is placed inside the charging case. After charging contacts disposed on the wireless headset is in contact with contacts in the charging case, the wireless headset may be charged.

Currently, in addition to picking up a normal voice signal, a microphone of the wireless headset may further pick up a wind sound signal with relatively strong energy. This causes severe wind noise.

SUMMARY

Technical solutions of this application provide a wireless headset, to reduce wind noise and improve call experience.

According to a first aspect, a wireless headset is provided, including a headset housing and a headset assembly accommodated in the headset housing. The headset assembly includes a microphone. The headset housing includes a bottom housing, the bottom housing includes a first bottom housing part and a second bottom housing part that are separated by using an insulating material, the first bottom housing part is a positive charging electrode, and the second bottom housing part is a negative charging electrode. A plurality of sound inlet holes are disposed on the bottom housing, and form microphone sound inlet channels communicating with each other.

According to the wireless headset provided in the technical solutions of this application, the plurality of sound inlet holes are disposed on the bottom housing of the headset, and form the microphone sound inlet channels communicating with each other. A sound structure channel is disposed on the bottom housing, so that wind sound signals that enter the wireless headset can be distributed and attenuated, to reduce wind noise and further improve call experience.

The bottom housing of the headset is used as the positive charging electrode and the negative charging electrode, and no charging contact needs to be separately disposed, so that space utilization of a cavity inside the headset can be increased.

Therefore, according to the wireless headset provided in the technical solutions of this application, the bottom housing of the headset can suppress wind noise and improve product call experience, and can also implement a charging function. Therefore, this can simplify a structure design, reduce structure complexity, reduce a process difficulty, and increase space utilization.

It should be understood that, the “microphone sound inlet channel” in this embodiment of this application is a channel that is used to pick up a normal voice signal by the microphone inside the headset. However, when the wind sound signal enters the headset, the wind sound signal may also be picked up by the microphone through the microphone sound inlet channel. In this embodiment of this application, the plurality of sound inlet holes disposed on the bottom housing form the microphone sound inlet channels communicating with each other. This can reduce a quantity of wind sound signals picked up by the microphone, to reduce wind noise. To be specific, some wind sound signals that enter the headset may not be picked up by the microphone, but flow out of the headset through the microphone sound inlet channels communicating with each other. In other words, the “microphone sound inlet channel” in this embodiment of this application may be used to pick up the normal voice signal by the microphone, and is also used by the wind sound signal to directly flow out of the headset without being picked up by the microphone.

With reference to the first aspect, in an embodiment, the plurality of sound inlet holes are evenly disposed on the bottom housing.

A plurality of sound inlet holes are evenly disposed on the bottom housing of the wireless headset, and the plurality of sound inlet holes communicate with each other, so that a voice signal in each direction can be picked up by the wireless headset, to improve call experience.

With reference to the first aspect, in an embodiment, the plurality of sound inlet holes are disposed on the insulating material.

A plurality of sound inlet holes are disposed on the insulating material, so that a structure design in which the first bottom housing part and the second bottom housing part are used as the positive charging electrode and the negative charging electrode is not affected. This can simplify structure complexity and reduce a process difficulty.

With reference to the first aspect, in an embodiment, the plurality of sound inlet holes include two sound inlet holes, and axes of the two sound inlet holes overlap.

Wind generally has a direction. Therefore, when the axes of the two sound inlet holes overlap, the wind sound signal is allowed to enter the headset from one of the sound inlet holes and then flow out from the other sound inlet hole. This has a better attenuation effect on the wind sound signal and a better wind noise reduction effect.

With reference to the first aspect, in an embodiment, a cross section of the microphone sound inlet channel is in at least one of the following shapes: a circle, an oval, a polygon, and a wave shape.

With reference to the first aspect, in an embodiment, the microphone sound inlet channels include a first sound inlet channel and a second sound inlet channel that communicate with each other, and the first sound inlet channel and the second sound inlet channel communicate with the microphone through a common sound inlet channel.

The first sound inlet channel and the second sound inlet channel that communicate with each other allow the wind sound signal to enter the headset from the first sound inlet channel and then flow out from the second sound inlet channel. This has a better attenuation effect on the wind sound signal and a better wind noise reduction effect. The first sound inlet channel and the second sound inlet channel communicate with the microphone through the common sound inlet channel. This does not affect pick-up of a normal voice signal.

With reference to the first aspect, in an embodiment, an outer wall of the bottom housing is arc-shaped.

The outer wall of the bottom housing is arc-shaped, so that the bottom housing can be conveniently in contact with charging electrodes in a manner of point contact, line contact, or surface contact, and can be applicable to charging electrodes in plurality of forms.

With reference to the first aspect, in an embodiment, the headset assembly further includes a flexible printed circuit and a battery electrically connected to the flexible printed circuit, and the first bottom housing part and the second bottom housing part each are electrically connected to the flexible printed circuit.

The first bottom housing part is used as the positive charging electrode, the second bottom housing part is used as the negative charging electrode, the first bottom housing part and the second bottom housing part each are electrically connected to the flexible printed circuit, and the battery is also electrically connected to the flexible printed circuit, to form a charging circuit of the battery, so that the wireless headset can be charged.

With reference to the first aspect, in an embodiment, a first bending part is disposed on an end of the flexible printed circuit close to the bottom housing, and the microphone is disposed on the first bending part, and is electrically connected to the flexible printed circuit.

The microphone is disposed at a position close to the bottom housing, to conveniently pick up a sound signal.

With reference to the first aspect, in an embodiment, a second bending part is disposed on an in-ear end of the flexible printed circuit in the headset housing, and a speaker is disposed on the second bending part.

According to a second aspect, a wireless headset is provided, including a headset housing and a headset assembly accommodated in the headset housing. The headset assembly includes a microphone. The headset housing includes a bottom housing, the bottom housing is one of a positive charging electrode and a negative charging electrode, and the other of the positive charging electrode and the negative charging electrode is separated from the bottom housing. A plurality of sound inlet holes are disposed on the bottom housing, and form microphone sound inlet channels communicating with each other.

According to the wireless headset provided in the technical solutions of this application, the plurality of sound inlet holes are disposed on the bottom housing of the headset, and form the microphone sound inlet channels communicating with each other. A sound structure channel is disposed on the bottom housing, so that wind sound signals that enter the wireless headset can be distributed and attenuated, to reduce wind noise and improve call experience.

Further, the bottom housing of the headset is used as one of the positive charging electrode and the negative charging electrode, and no charging contact needs to be separately disposed, so that space utilization of a cavity inside the headset can be increased. Specifically, the positive charging electrode or the negative charging electrode is disposed on the bottom housing, and the other of the positive charging electrode and the negative charging electrode is separated from the bottom housing. In this way, the bottom housing is used as one of the positive charging electrode and the negative charging electrode, so that a design of the bottom housing such as a material design or a structure design is more flexible.

Therefore, according to the wireless headset provided in the technical solutions of this application, the bottom housing of the headset can suppress wind noise and improve product call experience, and can also implement a charging function. Therefore, this can simplify a structure design, reduce structure complexity, reduce a process difficulty, and increase space utilization.

With reference to the second aspect, in an embodiment, the headset housing includes a front housing, a rear housing, and a headset handle, the front housing is connected to the rear housing, the rear housing extends downward to form the headset handle, the bottom housing is located at an end of the headset handle, and the other of the positive charging electrode and the negative charging electrode is disposed on the rear housing.

With reference to the second aspect, in an embodiment, the plurality of sound inlet holes are evenly disposed on the bottom housing.

A plurality of sound inlet holes are evenly disposed on the bottom housing of the wireless headset, and the plurality of sound inlet holes communicate with each other, so that a voice signal in each direction can be picked up by the wireless headset, to improve call experience.

With reference to the second aspect, in an embodiment, the plurality of sound inlet holes include two sound inlet holes, and axes of the two sound inlet holes overlap.

Wind generally has a direction. Therefore, when the axes of the two sound inlet holes overlap, the wind sound signal is allowed to enter the headset from one of the sound inlet holes and then flow out from the other sound inlet hole. This has a better attenuation effect on the wind sound signal and a better wind noise reduction effect.

With reference to the second aspect, in an embodiment, a cross section of the microphone sound inlet channel is in at least one of the following shapes: a circle, an oval, a polygon, and a wave shape.

With reference to the second aspect, in an embodiment, the microphone sound inlet channels include a first sound inlet channel and a second sound inlet channel that communicate with each other, and the first sound inlet channel and the second sound inlet channel communicate with the microphone through a common sound inlet channel.

The first sound inlet channel and the second sound inlet channel that communicate with each other allow the wind sound signal to enter the headset from the first sound inlet channel and then flow out from the second sound inlet channel. This has a better attenuation effect on the wind sound signal and a better wind noise reduction effect. In addition, the first sound inlet channel and the second sound inlet channel communicate with the microphone through the common sound inlet channel. This does not affect pick-up of a normal voice signal.

With reference to the second aspect, in an embodiment, an outer wall of the bottom housing is arc-shaped.

The outer wall of the bottom housing is arc-shaped, so that the bottom housing can be conveniently in contact with charging electrodes in a manner of point contact, line contact, or surface contact, and can be applicable to charging electrodes in plurality of forms.

With reference to the second aspect, in an embodiment, the headset assembly further includes a flexible printed circuit and a battery electrically connected to the flexible printed circuit, one end of the flexible printed circuit is electrically connected to the bottom housing, and the other end of the flexible printed circuit is electrically connected to the other of the positive charging electrode and the negative charging electrode.

The bottom housing is used as one of the positive charging electrode and the negative charging electrode and is electrically connected to the flexible printed circuit, the other of the positive charging electrode and the negative charging electrode is also electrically connected to the flexible printed circuit, and the battery is electrically connected to the flexible printed circuit, to form a charging circuit of the battery, so that the wireless headset can be charged.

With reference to the second aspect, in an embodiment, a first bending part is disposed on an end of the flexible printed circuit close to the bottom housing, and the microphone is disposed on the first bending part, and is electrically connected to the flexible printed circuit.

The microphone is disposed at a position close to the bottom housing, to conveniently pick up a sound signal.

With reference to the second aspect, in an embodiment, a second bending part is disposed on an in-ear end of the flexible printed circuit in the headset housing, and a speaker is disposed on the second bending part.

According to a third aspect, a terminal is provided, including a wireless headset and a charging case for accommodating the wireless headset. The wireless headset includes a headset housing and a headset assembly accommodated in the headset housing. The headset assembly includes a microphone. The headset housing includes a bottom housing, the bottom housing includes a first bottom housing part and a second bottom housing part that are separated by using an insulating material, the first bottom housing part is a positive charging electrode, and the second bottom housing part is a negative charging electrode. A plurality of sound inlet holes are disposed on the bottom housing, and form microphone sound inlet channels communicating with each other. The charging case includes a charging case body and a charging case lid, the charging case body is provided with accommodation space, and the accommodation space is used to accommodate the headset.

The charging case lid may be configured to cover the accommodation space. The accommodation space includes a bottom accommodation groove provided with charging electrodes respectively corresponding to the first bottom housing part and the second bottom housing part, and the bottom accommodation groove is used to accommodate the bottom housing of the wireless headset.

The terminal provided in the technical solutions of this application includes the wireless headset and the charging case. The bottom housing of the wireless headset can suppress wind noise and improve product call experience, and can also implement a charging function. Therefore, this can simplify a structure design, reduce structure complexity, reduce a process difficulty, and increase space utilization. The charging case is configured to accommodate the wireless headset, and can also be used as a power supply to charge the wireless headset.

With reference to the third aspect, in an embodiment, the charging electrode is any one of a charging contact, a charging spring, a charging block, or a charging surface.

With reference to the third aspect, in an embodiment, the charging case body and the charging case lid are rotatably connected.

According to a fourth aspect, a terminal is provided, including a wireless headset and a charging case for accommodating the wireless headset. The wireless headset includes a headset housing and a headset assembly accommodated in the headset housing. The headset assembly includes a microphone. The headset housing includes a bottom housing, the bottom housing is one of a positive charging electrode and a negative charging electrode, and the other of the positive charging electrode and the negative charging electrode is separated from the bottom housing. A plurality of sound inlet holes are disposed on the bottom housing, and form microphone sound inlet channels communicating with each other. The charging case includes a charging case body and a charging case lid, the charging case body is provided with accommodation space, and the charging case lid is configured to cover the accommodation space. The accommodation space includes a bottom accommodation groove provided with a charging electrode corresponding to the bottom housing, and the bottom accommodation groove is used to accommodate the bottom housing of the wireless headset. A charging electrode corresponding to the other of the positive charging electrode and the negative charging electrode is not in the bottom accommodation groove.

The terminal provided in the technical solutions of this application includes the wireless headset and the charging case. The bottom housing of the wireless headset can suppress wind noise and improve product call experience, and can also implement a charging function. Therefore, this can simplify a structure design, reduce structure complexity, reduce a process difficulty, and increase space utilization. The charging case is configured to accommodate the wireless headset, and can also be used as a power supply to charge the wireless headset.

With reference to the fourth aspect, in an embodiment, the headset housing further includes a front housing, a rear housing, and a headset handle, the front housing is connected to the rear housing, the rear housing extends downward to form the headset handle, the bottom housing is located at an end of the headset handle, and the other of the positive charging electrode and the negative charging electrode is disposed on the rear housing. The charging electrode corresponding to the other of the positive charging electrode and the negative charging electrode is disposed at a position corresponding to the rear housing.

With reference to the fourth aspect, in an embodiment, the charging electrode is any one of a charging contact, a charging spring, a charging block, or a charging surface.

With reference to the fourth aspect, in an embodiment, the charging case body and the charging case lid are rotatably connected.

DESCRIPTION OF EMBODIMENTS

Figure 1:
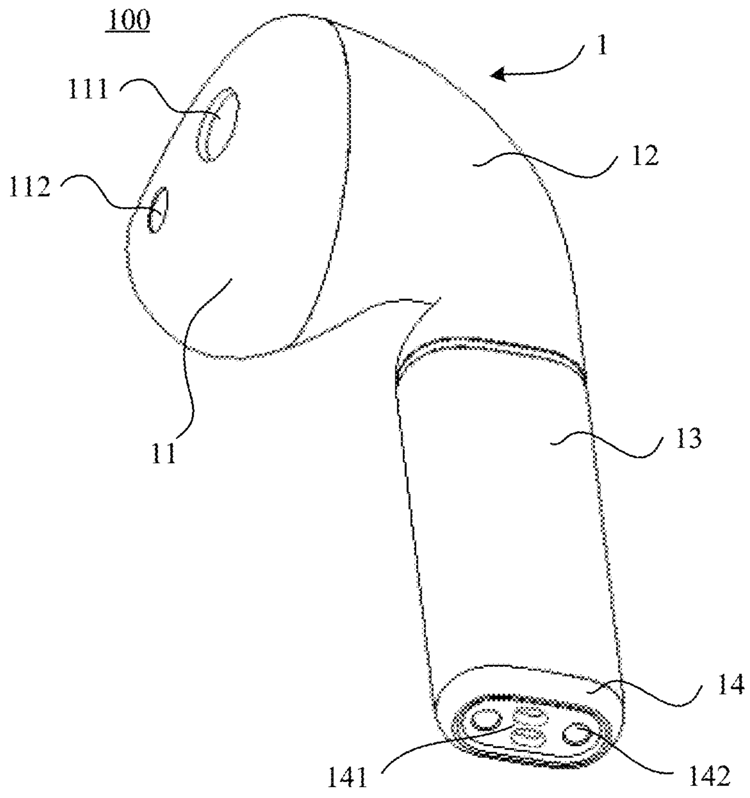
FIG. 1 is a schematic diagram of a structure of a wireless headset according to an embodiment of this application.

The following describes technical solutions in this application with reference to the accompanying drawings.

Embodiments of this application provide a wireless headset that may be used in a call scenario as an accessory of a terminal device. The terminal device includes but is not limited to a handheld device, a vehicle-mounted device, a wearable device, a computing device, or another processing device connected to a wireless modem. The terminal device may include a cellular phone, a smartphone, a personal digital assistant (PDA) computer, a tablet computer, a laptop computer, a vehicle-mounted computer, a smartwatch, a smart band, a pedometer, and another terminal device that has a call function. The terminal device in the embodiments of this application may also be referred to as a terminal. The call scenario includes but is not limited to an indoor call scenario, an outdoor call scenario, and an in-vehicle call scenario. The call scenario may include a quiet call scenario, a noisy call scenario (scenarios such as a street, a shopping mall, an airport, a station, a construction site, rain, game watching, or a concert), a riding call scenario, an outdoor call scenario with wind, a single-ear call scenario, a double-ear call scenario, and another scenario in which a call can be made.

Headsets (earphone, also referred to as headphone, headset, earpiece) may be a pair of conversion units, configured to: receive an electrical signal sent by a media player or a receiver, and convert the electrical signal into an audible sound wave by using a speaker close to the ear.

The headsets may generally fall into wired headsets (wired headphone or wired headset) and wireless headsets (wireless headset). The wired headsets have two headsets and a connection cable, and the left headset and right headset are connected by using the connection cable. The wired headsets may be inconvenient to wear and need to be connected to a terminal device by using a headset jack, and power of the terminal device needs to be consumed in a working process. However, the wireless headsets may communicate with the terminal device by using a wireless communication technology (for example, a Bluetooth technology, an infrared radio frequency technology, a 2.4G wireless technology, and an ultrasonic wave). Compared with the wired headsets, the wireless headsets are rapidly developed because the wireless headsets get rid of a limitation of a physical cable and are more convenient to use. A left headset of the wireless headsets may be connected to a right headset through Bluetooth.

Bluetooth is a low-cost and large-capacity short-distance wireless communication standard. In the Bluetooth standard, a microwave frequency band is selected for working. A transmission rate may be 1 M bytes per second, and a maximum transmission distance may be 10 meters, and may reach 100 meters after transmit power is added. With cancellation of headset jacks on some terminal devices, and popularization and version update of the Bluetooth technology, various wireless Bluetooth headsets are pouring into the market. From an early commercial single-ear Bluetooth headset used in a call scenario to a stereo Bluetooth headset that can support music playback and then to a true wireless Bluetooth headset that totally gets rid of a cable, the wireless headset has increasingly more functions and application scenarios.

True wireless Bluetooth headsets are also referred to as true wireless stereo (TWS) headsets. The TWS headsets totally get rid of a cable connection manner, and include two headsets (for example, a primary headset and a secondary headset). For example, during use, a terminal device (which may also be referred to as a transmit device such as a mobile phone, a tablet, or a music player with Bluetooth output) is wirelessly connected to the primary headset, and then the primary headset is connected to the secondary headset in a Bluetooth manner, so that Bluetooth left and right channels can be separately used in a true wireless manner. The left headset and the right headset of the TWS headsets may constitute a stereo system through Bluetooth, so that performance of listening to music, calling, and wearing is improved. In addition, either of the two headsets may further work independently. For example, when the primary headset is not connected to the secondary headset, the primary headset may return to mono sound quality. Because the left headset and the right headset of the TWS headsets are not physically connected, almost all TWS headsets are equipped with a charging case with both a charging function and an accommodation function. The charging case can supply power to and provide the accommodation function for the wireless headsets. When the headsets are powered off, the headsets only need to be placed inside the case, so that the headsets can be automatically disconnected and the charging case charges the headsets.

FIG. 1 is a schematic diagram of a structure of a wireless headset according to an embodiment of this application. As shown in FIG. 1, a wireless headset 100 may include a headset housing 1 and a headset assembly (not shown in the figure) accommodated in an internal cavity formed by the headset housing 1. The headset assembly is described below with reference to FIG. 2(*a*) and FIG. 2(*b*), and details are not described herein.

It should be noted that, in the descriptions of this embodiment of this application, directions or position relationships indicated by terms such as "center", "up", "down", "front", "rear", "bottom", "top", "inside", and "outside" are based on the directions or the position relationships shown in the accompanying drawings, and are merely intended to describe this application and simplify the descriptions, but are not intended to indicate or imply that an indicated apparatus or element needs to have a specific direction or be constructed and operated in a specific direction, and therefore cannot be understood as a limitation on this application. In addition, terms "first", "second", and "third" are merely intended for a descriptive purpose, and cannot be understood as indicating or implying relative importance.

It should be further noted that in this embodiment of this application, a same reference numeral indicates a same component or a same element. For same elements in this embodiment of this application, a reference numeral may be marked in the figure by using only a part or a component thereof as an example. It should be understood that, for another same part or component, the reference numeral is also applicable.

Refer to FIG. 1. The headset housing 1 may include a front housing 11, a rear housing 12, a headset handle 13, and a bottom housing 14. The front housing 11 is a housing that faces a side of the ear when the wireless headset is used. The rear housing 12 is a housing that faces away from the side of the ear when the wireless headset is used. The front housing 11 is connected to the rear housing 12. The rear housing 12 extends downward to form the headset handle 13. The bottom housing 14 is located at an end of the headset handle 13. The front housing 11 is roughly in a hood shape, and is connected to one end of the rear housing 12 that is in a hood shape. The headset handle 13 is roughly cylindrical, and is connected to the other end of the rear housing 12. There is an angle between extension lines of the two ends of the rear housing 12, for example, 90°. The front housing 11 and the rear housing 12 may be connected through clamping or integration. The rear housing 12 and the headset handle 13 may be connected through clamping or integration. The bottom housing 14 is located at the bottom of the headset handle 13, and the bottom housing 14 and the headset handle 13 may be connected through clamping or integration. A sound inlet hole 141 is disposed on the bottom housing 14, and is used to communicate the outside of the headset with a cavity inside the headset, so that an external sound signal enters the headset through the sound inlet hole 141, and is picked up by a microphone in the cavity inside the headset. A hole 142 for exposing a charging contact is further disposed on the bottom housing 14, and a charging contact of the wireless headset 100 protrudes from the cavity inside the headset through the hole 142. In this way, when the wireless headset 100 is charged, the contact is in contact with a contact in a charging case to perform charging. FIG. 1 shows an example in which two holes 142 for protrusion of charging contacts are disposed on two sides of the sound inlet hole 141. A charging contact corresponding to one hole 142 is used as a positive electrode, and a charging contact corresponding to the other hole 142 is used as a negative electrode. A sound outlet hole (not directly shown from a perspective of the wireless headset in FIG. 1) is disposed on the front housing 11, and is used to communicate the outside of the headset with the cavity inside the headset, so that a sound signal produced by a speaker unit in the cavity inside the headset enters the ear through the sound outlet hole. In some implementations, a pressure relief hole 111 may further be disposed on the front housing 11, to facilitate air flow-in and flow-out, and balance pressure inside and outside the headset. In this way, the built-in speaker unit vibrates more freely and smoothly, to bring a better acoustic effect. In some implementations, a hole 112 may be further disposed on the front housing 11, and a sensor may be disposed at a position of the hole 112. For example, a contact sensor is disposed at the hole 112 on the front housing 11, to sense whether the headset is worn. It may be understood that a sensor may be disposed inside the housing, to sense whether the headset is worn. In this case, no hole 112 may be disposed on the front housing 11.

Figure 2B:
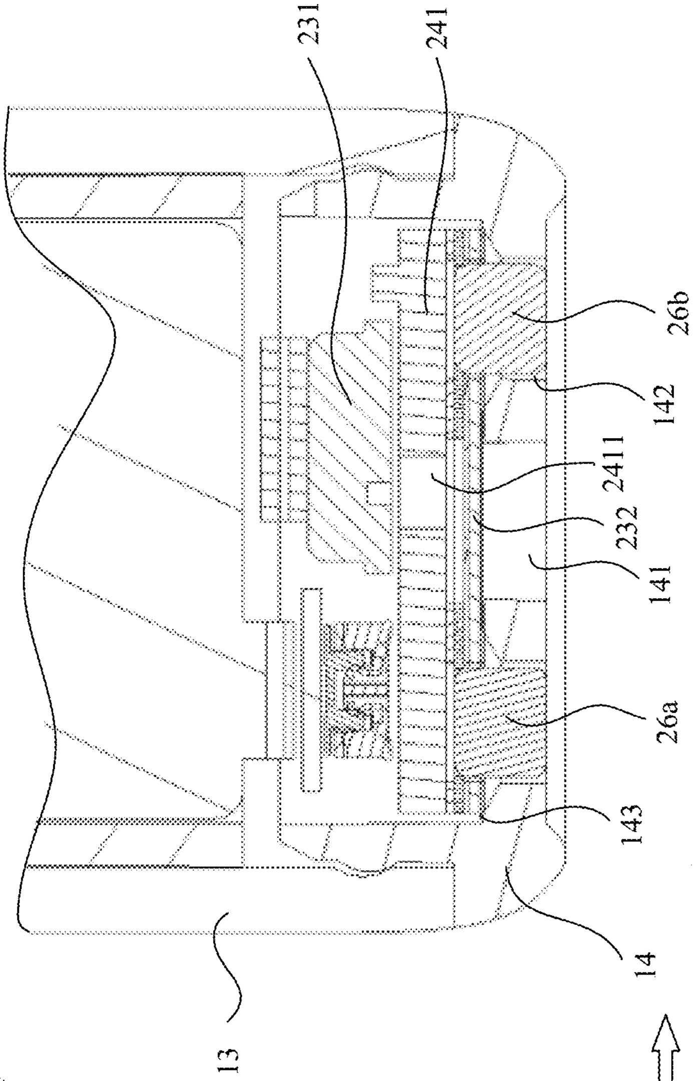
FIG. 2(*a*) and FIG. 2(*b*) are a schematic cross-sectional diagram of the wireless headset in FIG. 1.
Figure 2A:
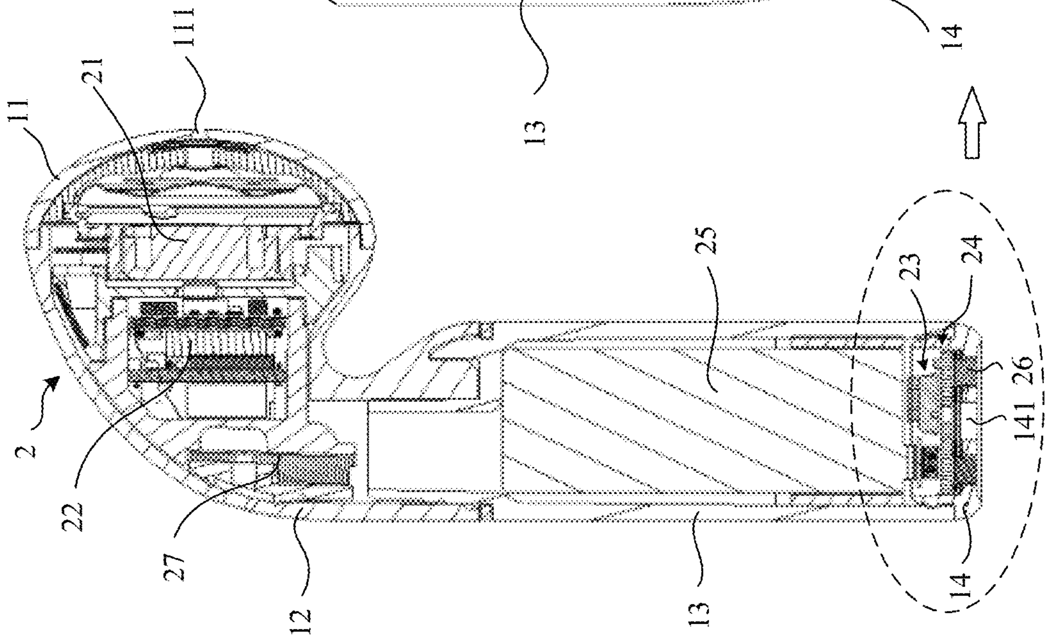

FIG. 2(*a*) and FIG. 2(*b*) are a schematic cross-sectional diagram of an internal structure of the wireless headset in FIG. 1. It may be understood that the cross-sectional diagram may be a stepped cross-sectional diagram. The headset assembly 2 accommodated in the internal cavity formed by the headset housing 1 is shown in the figure.

Refer to FIG. 2(*a*) and FIG. 2(*b*). The headset assembly 2 may include a speaker unit 21, a control unit 22, a sound receiving unit 23, a flexible printed circuit (FPC) 24, a battery 25, a charging unit 26, a sensor device (not shown in the figure), and the like. The headset assembly 2 further includes an auxiliary sound receiving unit 27. The auxiliary sound receiving unit 27 may be a microphone, for example, a microphone for picking up background sound in a call scenario.

Refer to FIG. 2(*a*). The speaker unit 21 is located in a cavity formed by the front housing 11 and the rear housing 12, and produces sound in a direction facing the front housing 11. The speaker unit 21 may be an electric-acoustic transducer, configured to convert an audio electrical signal into a sound signal. The speaker unit 21 may be a moving-coil unit, a moving-iron unit, or a unit integrated with a coil and an iron. The speaker unit 21 may also be referred to as a loudspeaker or a speaker. Therefore, the moving-coil unit, the moving-iron unit, or the unit integrated with the coil and the iron may also be respectively referred to as a moving-coil speaker (or referred to as a dynamic speaker), a moving-iron speaker, and a speaker integrated with a coil and an iron. There are many types of speaker units 21. However, basic working principles thereof are similar. An example in which the speaker unit 21 is a moving-coil speaker is used. The moving-coil speaker may usually include a diaphragm, a voice coil, a permanent magnet, a support bracket, and the like. When an audio current flows in the voice coil of the speaker, the voice coil generates an alternating magnetic field under an action of the current, and the permanent magnet also generates a constant magnetic field whose size and direction are unchanged. Because a size and a direction of the magnetic field generated by the voice coil continuously change with the audio current, the voice coil moves in a direction perpendicular to a direction of the current in the voice coil due to interaction of the two magnetic fields. Because the voice coil is connected to the diaphragm, the diaphragm is driven to vibrate. Because vibration of the diaphragm pushes air, the air is compressed and expanded, and pressure is generated based on original atmospheric pressure, so that a sound wave is radiated outward. Sound is sensed when sound pressure acts on the ear. In other words, sound is produced because the diaphragm vibrates to drive the air to vibrate. A larger current that is input into the voice coil indicates larger force of the magnetic field, a larger vibration amplitude of the diaphragm, and louder sound. A part of the speaker that produces a high pitch is mainly in the center of the diaphragm. When the center of the diaphragm of the speaker is harder, a sound playback effect of the speaker is better. A part of the speaker that produces a low pitch is mainly on an edge of the diaphragm. If the edge of the diaphragm of the speaker is soft and a cone diameter is large, a low-pitch production effect of the speaker is better.

In an implementation solution, the speaker unit 21 can receive an audio signal and a control signal (for example, a streaming media control signal) transmitted by a terminal device, and may further transmit the received audio signal and control signal to another speaker unit. For example, when the speaker unit 21 is used as a primary speaker, the speaker unit 21 may transmit, to a secondary speaker, the audio signal, the control signal, and the like that are received from the terminal device, so that audio is synchronously played in two separate speakers, to implement a stereo effect.

Refer to FIG. 2(*a*). The control unit 22 is located in the cavity formed by the front housing 11 and the rear housing 12. Compared with the speaker unit 21, the control unit 22 is at a position far from the front housing 11, and is connected to the speaker unit 21. The control unit 22 may include a main board (or referred to as a main chip or a main chip), a Bluetooth chip, and the like, and may be configured to manage charging, transmit a signal, and the like. In some embodiments, the control unit 22 may be further configured to actively reduce noise. Optionally, the control unit 22 may be a microprocessor.

Refer to FIG. 2(*a*). The sound receiving unit 23 is located in a cavity formed by the bottom housing 14 and the headset handle 13, and the bottom housing 14 and the headset handle 13 may be connected through clamping. Refer to FIG. 2(*b*). The sound receiving unit 23 includes a microphone (MIC) 231 fastened to the flexible printed circuit (FPC) 24, a waterproof and dustproof film 232, and the like.

For example, as shown in FIG. 2(*b*), the flexible printed circuit FPC 24 may include a plurality of parts. One end (represented as a first FPC part 241 in this embodiment of this application for ease of description) of the FPC 24 is located in the cavity formed by the bottom housing 14 and the headset handle 13. The first FPC part 241 may be electrically connected to the sound receiving unit 23, the charging unit 26, and the like. The other end (represented as a second FPC part 242 in this embodiment of this application for ease of description, where references may be made to FIG. 11) of the FPC is located in the cavity formed by the front housing 11 and the rear housing 12. The second FPC part 242 may be electrically connected to the control unit 22, the speaker unit 21, and the like. For example, refer to FIG. 11. A first bending part (for example, the first FPC part 241) may be disposed on an end of the flexible printed circuit 24 close to the bottom housing 14. The microphone is disposed on the first bending part, and is electrically connected to the flexible printed circuit 24. A second bending part may be disposed on an in-ear end of the flexible printed circuit 24 in the headset housing, and the speaker unit (for example, a speaker) 21 is disposed on the second bending part. The first FPC part 241 may extend to the second FPC part 242 through a cavity formed by the headset handle 13. For ease of description, in this embodiment of this application, an extension part between the first FPC part 241 and the second FPC part 242 is represented as an intermediate FPC part. The intermediate FPC part may be electrically connected to the battery 25, an antenna module (not shown in the figure), and the like. The first FPC part 241, the second FPC part 242, and the intermediate FPC part may be fastened to a corresponding housing part of the headset housing 1.

In this embodiment of this application, the first FPC part 241 may be located in the cavity formed by the bottom housing 14 and fastened to a bottom wall 143 of the bottom housing 14. The waterproof and dustproof film 232 is in a sheet shape, and is disposed on a side of the first FPC part 241 close to the bottom wall 143 of the bottom housing 14. Upper and lower surfaces of the waterproof and dustproof film 232 each are coated with an adhesive layer such as double-sided tape. The adhesive layer on the upper surface of the waterproof and dustproof film 232 is used to adhere the upper surface of the waterproof and dustproof film 232 to a lower surface of the first FPC part 241, and the adhesive layer on the lower surface of the waterproof and dustproof film 232 is used to adhere the lower surface of the waterproof and dustproof film 232 to the bottom wall 143 of the bottom housing 14. The first FPC part 241 may be fastened to the bottom wall 143 of the bottom housing 14 by using the waterproof and dustproof film 232 and the adhesive layer on the waterproof and dustproof film 232. The waterproof and dustproof film 232 has dense meshes. This ensures that a sound signal can reach the microphone 231 by using the waterproof and dustproof film 232, can also prevent dust and water from entering the bottom housing 14, and can further prevent an external object from piercing a diaphragm of the microphone 231. The waterproof and dustproof film 232 is mainly used in a range of the sound inlet hole 141. An external sound signal can enter the headset only through the sound inlet hole 141. Impurities such as dust and moisture are intercepted outside the headset housing 1 by the waterproof and dustproof film 232. As described above, the sound inlet hole 141 may be located at the bottom of the bottom housing 14, and is opposite to the microphone 231.

The microphone 231 may be fastened to the first FPC part 241 and electrically connected to the first FPC part 241. An FPC hole 2411 is disposed at a position that is on the first FPC part 241 and that corresponds to the microphone 231, to pick up a sound signal by the microphone 231 by using the first FPC part 241. A sound entry hole of a microphone cell in the microphone 231, the FPC hole 2411, and the sound inlet hole 141 are used to communicate the microphone 231 with the outside of the headset housing 1 to form a sound signal transmission channel. In some embodiments, the sound signal transmission channel may be referred to as a microphone sound inlet channel or a microphone sound pickup hole, and the microphone sound pickup hole is used to transmit an external sound signal to the microphone 231 to be picked up by the microphone 231. It should be understood that the microphone 231 may include one or more microphone cells, each microphone cell may be an independent component, and the plurality of microphone cells may be separately disposed. This is not limited in this embodiment of this application. For ease of understanding and description, in this embodiment of this application, an example in which the microphone 231 includes one microphone cell is used for description. It should be further understood that each microphone cell includes a corresponding sound entry hole of the microphone cell, and a plurality of microphone cells may share one sound inlet hole 141. In other words, after entering the headset from one sound inlet hole 141, a sound signal may reach sound entry holes of the plurality of microphone cells and be picked up by the plurality of microphone cells.

The microphone 231, also referred to as a microphone, a microphone, a microphone, a microphone, a microphone, and the like, is a transducer for converting a sound signal into an electrical signal, and is a device whose function is exactly opposite to a function of the speaker unit 21 (the speaker unit 21 is configured to convert an electrical signal into a sound signal). According to different transduction principles of the microphone, the microphone 231 may be a dynamic (moving-coil or ribbon) microphone, a condenser microphone, a piezoelectric (crystal or ceramic) microphone, an electromagnetic microphone, a semiconductor microphone, or the like, or may be a cardioid microphone, a hypercardioid microphone, a supercardioid microphone, a bidirectional (8-shaped) microphone, a non-directional (omnidirectional) microphone, or the like. Various different heard sound is generated due to small pressure differences between surrounding air. The pressure differences can be well and truly transmitted in the air at a considerable distance, that is, sound is an invisible sound wave formed due to different atmospheric pressure. In this embodiment of this application, the invisible sound wave is referred to as a sound pressure wave. The microphone 231 may convert a change of the sound into a change of a voltage or a current by using a specified mechanism, and then submit the change to a circuit system for processing. Strength of the sound may be represented by using sound pressure, and corresponds to an amplitude of the voltage or the current. A speed at which the sound changes corresponds to a frequency of an electrical signal. The microphone 231 includes a diaphragm, and a prerequisite that the microphone 231 performs transduction is that the sound needs to drive the diaphragm of the microphone to move.

For example, a working principle of the moving-coil microphone is that a diaphragm drives a coil to move in a manner of cutting a magnetic induction line, to generate an electrical signal. For the ribbon microphone, a ribbon is used as a diaphragm, and the ribbon is placed in a high magnetic field. When sound drives the ribbon to vibrate, the ribbon moves in a manner of cutting a magnetic induction line, to generate an electrical signal. For the condenser microphone, a very thin metal diaphragm is used as a plate of a capacitor, and another metal back plate at a very short distance (about a few tenths of a millimeter) is used as another plate. In this way, vibration of the diaphragm causes a change of a capacitance to form an electrical signal. An electret condenser microphone (ECM) is a special condenser-type "acoustic-electric" conversion device made of an electret material. For the crystal microphone, when a shape of a crystal changes, an electrical property of the crystal is changed. A diaphragm is connected to the crystal, so that the crystal generates an electrical signal when a sound wave strikes the diaphragm. The following briefly describes a working principle of a microphone with reference to FIG. 3(*a*) and FIG. 3(*b*). Working principles of other types of microphones are similar, and are not listed one by one herein.

Figure 3A:
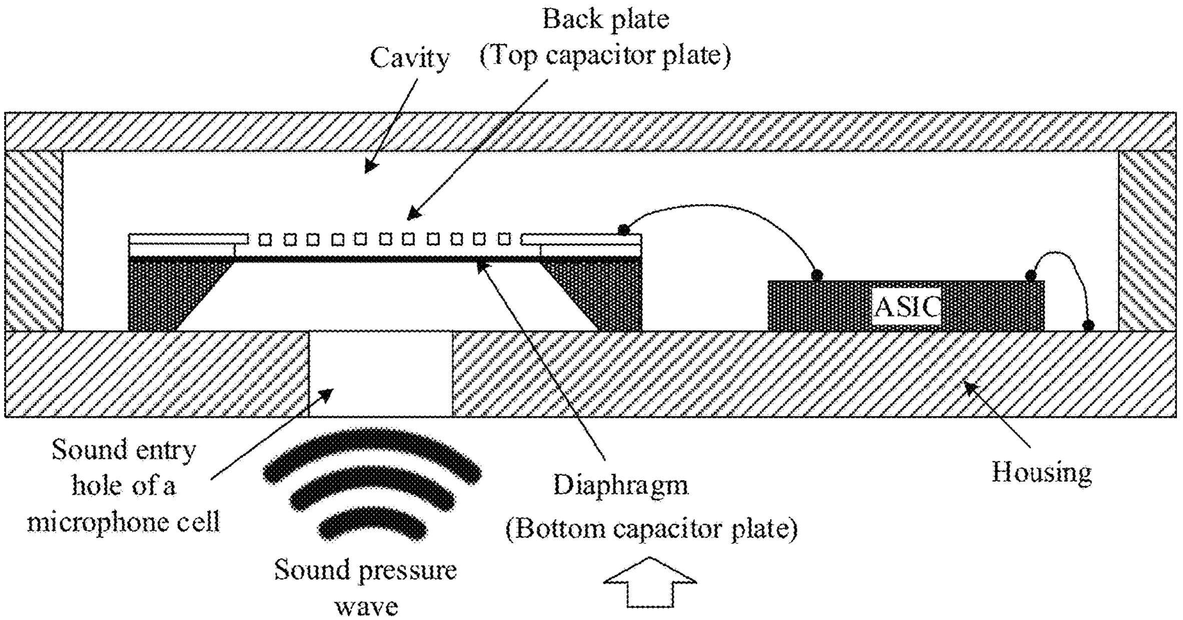
FIG. 3(*a*) and FIG. 3(*b*) are a schematic diagram of a working principle of a microphone.
Figure 3B:
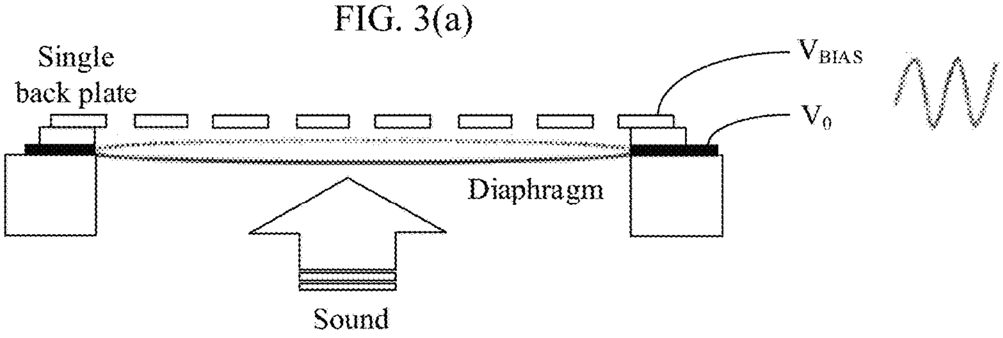

As shown in FIG. 3(*a*) and FIG. 3(*b*), an example in which the microphone 231 is a micro-electro-mechanical system (MEMS) microphone is used. MEMS is a micro-electro-mechanical system that is integrated with a micro sensor, a micro actuator, a micro signal processing and control circuit, a micro interface circuit, micro communication, and a micro power supply. A microphone manufactured based on an MEMS technology is an MEMS microphone. Briefly, a capacitor is integrated on a silicon wafer. Therefore, the MEMS microphone may also be referred to as a microphone chip or a silicon microphone. The MEMS microphone mainly includes a MEMS micro-capacitive sensor, a micro integrated conversion circuit (amplifier), an acoustic cavity, and a radio frequency (RF) anti-noise circuit. A plate part of an MEMS micro capacitor includes a silicon diaphragm for receiving sound and a silicon back plate. The silicon diaphragm may directly transmit a received audio signal to the micro integrated circuit by using the MEMS micro-capacitive sensor. The micro integrated circuit may convert and amplify a high-impedance audio electrical signal into a low-impedance audio electrical signal, and the RF anti-noise circuit performs filtering on the low-impedance audio electrical signal, to output an electrical signal that matches a front circuit, so as to complete "acoustic-electric" conversion.

FIG. 3(*a*) is a schematic diagram of a structure of a microphone cell. The microphone cell may include a housing in which a cavity is formed, a movable diaphragm (also referred to as an acoustic diaphragm or an acoustic diaphragm) and a fixed back plate that are disposed inside the cavity, an application-specific integrated circuit (ASIC), and the like. A sound entry hole of the microphone cell that is used to pick up a sound signal is disposed on the housing, and a sound pressure wave may enter the microphone cell through the sound entry hole of the microphone cell. In the cavity, the diaphragm is opposite to the back plate, and the diaphragm is located on a side close to the sound entry hole of the microphone cell. As a bottom capacitor plate in the microphone cell, the diaphragm may have a very thin solid structure and is easily bent. When atmospheric pressure changes due to a sound wave or when a sound pressure wave acts on the diaphragm, the diaphragm is bent. The back plate is located on a side far from the sound entry hole of the microphone cell. As a top capacitor plate in the microphone cell, the back plate has excellent rigidity, may have a through-hole structure, and has excellent ventilation performance. When the atmospheric pressure changes due to the sound wave, the diaphragm is bent due to the change of the atmospheric pressure. Because the back plate is thick and has a plurality of holes, when air flows through the back plate, the back plate remains still. When the diaphragm vibrates, a capacitance between the diaphragm and the back plate changes. The ASIC device may convert the change of the capacitance into an electrical signal. Specifically, refer to FIG. 3(*b*). The ASIC device applies a fixed reference charge ($V_0$ in the figure) to the diaphragm of the microphone by using a charge pump. When the capacitance between the diaphragm and the back plate changes because the diaphragm moves, the ASIC measures a voltage change ($V_{BIAS}$ in the figure), to complete conversion from a sound signal to an electrical signal.

Still refer to FIG. 2(*a*) and FIG. 2(*b*). The headset assembly 2 in this embodiment of this application further includes the battery 25, the charging unit 26, the sensor device (not shown in the figure), and the like. Optionally, the headset assembly 2 further includes the auxiliary sound receiving unit 27. The auxiliary sound receiving unit 27 may be a microphone, for example, a microphone for picking up background sound in a call scenario.

The battery 25 may be disposed in the cavity formed by the headset handle 13, and is electrically connected to the flexible printed circuit 24. Specifically, a positive electrode and a negative electrode of the battery 25 each are electrically connected to the flexible printed circuit 24. With a circuit in the flexible printed circuit 24, the battery 25 may be charged and the battery 25 may supply power to the headset assembly 2. An antenna may be further disposed in the cavity formed by the headset handle 13, to receive and send a signal.

The charging unit 26 may be disposed at the bottom of the headset, and is configured to charge the battery 25. One end of the charging unit 26 is connected to the flexible printed circuit 24 in the bottom housing 14, and the other end may be in contact with metal connector pins in the charging case to form a charging loop. When the battery 25 is charged, charging contacts of the headset are in contact with contacts in the charging case to form an electrical connection. With the circuit in the flexible printed circuit 24, a charging current may flow from the positive electrode charging contact to the positive electrode of the battery 25, then flow from the negative electrode of the battery 25 to the negative electrode charging contact, and finally return to the charging case.

In some embodiments, the sensor device included in the headset assembly 2 may include an optical sensor, an acceleration sensor, a distance sensor, a bone conduction sensor, and the like. The sensor device may be disposed on the flexible printed circuit 24, and is configured to sense or receive an external signal and the like.

In some embodiments, the headset assembly 2 further includes the auxiliary sound receiving unit 27. The auxiliary sound receiving unit 27 may be another microphone, so that the auxiliary sound receiving unit 27 and the sound receiving unit 23 form a dual microphone. The sound receiving unit 23 may be an ordinary microphone used by a user during a call to collect a human voice (that is, to pick up voice in a call), and the auxiliary sound receiving unit 27 may be a microphone for picking up background sound, and has a background noise collection function to collect ambient noise. The auxiliary sound receiving unit 27 is far from the sound receiving unit 23, and may be mounted at a position that is in the cavity formed by the front housing 11 and the rear housing 12 and that is close to the rear housing 12. The dual-microphone design can effectively resist interference of the ambient noise of the headset and greatly improve clarity of a normal call.

It should be understood that a structure of the wireless headset shown in FIG. 1 is merely an example. In some other implementations, the wireless headset 100 may be in another shape, and a size thereof may be less than or greater than that of the wireless headset 100. A structure of the headset housing 1 is also merely an example. The headset housing 1 may be in another shape. For example, the headset housing 1 may not include the headset handle 13, so that an overall size of the wireless headset is reduced, or the headset handle 13 may be cylindrical or square, or the front housing 11 is in a regular hood shape, an asymmetric shape, or the like. This is not limited in this embodiment of this application. In addition, an arrangement manner and a type of each element in the headset assembly 2 are also merely an example. Types and a quantity of elements included in the headset assembly 2 may be correspondingly selected based on design performance of the wireless headset and a design shape of the headset. The arrangement manner of each element in the headset assembly 2 may be correspondingly designed based on a shape of the headset housing 1. For example, a button cell may be selected as the battery 25 to adapt to a smaller cavity inside the headset, and a position of the battery 25 may be disposed in the cavity formed by the front housing 11 and the rear housing 12. This is not limited in this embodiment of this application.

Figure 4:
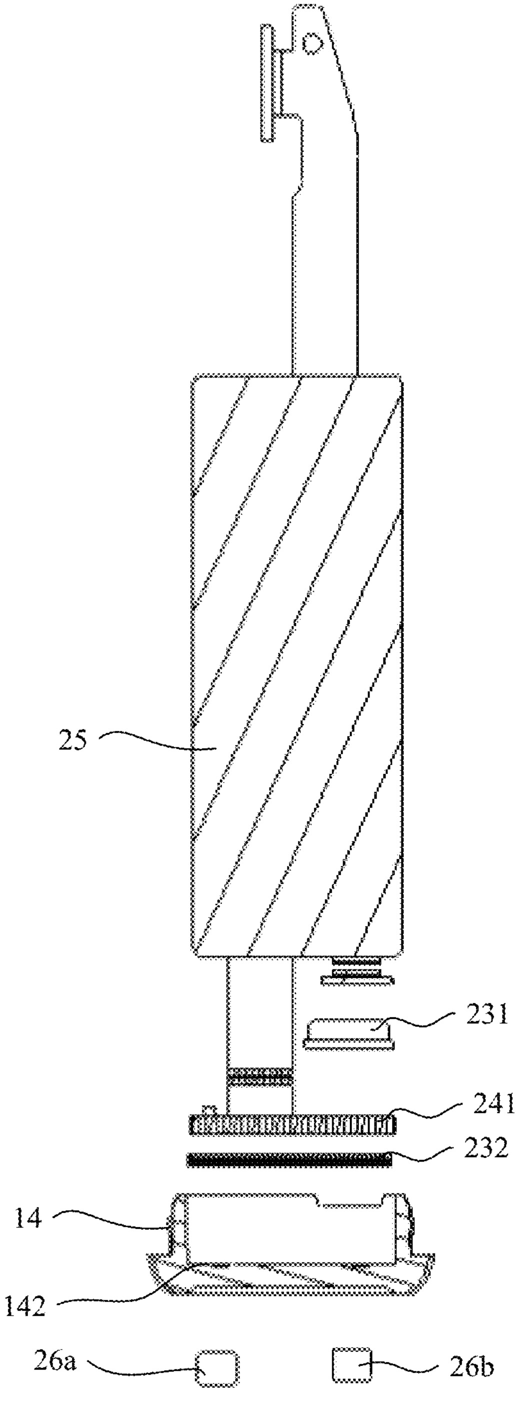
FIG. 4 is a schematic exploded view of a headset assembly in FIG. 2(*a*) and FIG. 2(*b*)

FIG. 4 is a schematic exploded view of some elements in the headset assembly 2. As shown in FIG. 2(*a*), FIG. 2(*b*), and FIG. 4, the sound receiving unit 23, the charging unit 26, and the flexible printed circuit 24 are disposed in the cavity formed by the bottom housing 14. In the wireless headset in this embodiment of this application, the charging unit 26 includes two charging contacts (or referred to as charging PINs), for example, a charging contact 26*a* and a charging contact 26*b* shown in FIG. 2(*a*), FIG. 2(*b*), and FIG. 4. Holes

142 are disposed on the bottom housing 14, and the two charging contacts separately protrude from the headset through the two holes 142. One end of each charging contact is connected to the first FPC part 241 of the flexible printed circuit 24, and the other end is exposed to the bottom housing 14, to be in contact with the metal connector pin in the charging case to charge the battery 25 of the headset. One charging contact in the two charging contacts is used as a positive charging electrode (or referred to as a positive electrode terminal or a positive electrode charging terminal), and the other charging contact is used as a negative charging electrode (or referred to as a negative electrode terminal or a negative electrode charging terminal). The positive electrode and the negative electrode of the battery 25 are also connected to the flexible printed circuit 24. When the wireless headset is placed inside the charging case, the two charging contacts of the charging unit 26 are in contact with the contacts in the charging case to form a charging loop, to charge the battery 25 in the headset.

The wireless headset provided in this embodiment of this application can reduce wind noise. Still refer to FIG. 1. In the wireless headset 100 in this embodiment of this application, a plurality of sound inlet holes 141 are disposed on the bottom housing 14, and the plurality of sound inlet holes 141 may form microphone sound inlet channels communicating with each other. In this way, a wind sound signal may enter the headset from one sound inlet hole in the plurality of sound inlet holes 141 and then flow out from another sound inlet hole, so that a quantity of wind sound signals acting on the diaphragm of the microphone 231 is reduced, to reduce wind noise. FIG. 1 shows an example of two sound inlet holes 141. The two sound inlet holes 141 are disposed between two holes 142 on the bottom housing 14. Optionally, the plurality of sound inlet holes 141 may be disposed at other positions on the bottom housing 14, provided that a voice signal can be picked up by the microphone through the sound inlet hole. Optionally, the plurality of sound inlet holes 141 and a position on the microphone for exposing the diaphragm are staggered. In this way, after passing through the sound inlet hole, the wind sound signal does not directly act on the diaphragm of the microphone, so that a quantity of wind sound signals picked up by the microphone can be reduced, to reduce wind noise.

It should be understood that, the "microphone sound inlet channel" in this embodiment of this application may be a channel that is used to pick up a normal voice signal by the microphone inside the headset. However, when the wind sound signal enters the headset, the wind sound signal may also be picked up by the microphone through the microphone sound inlet channel. In this embodiment of this application, the plurality of sound inlet holes disposed on the bottom housing form the microphone sound inlet channels communicating with each other. This can reduce a quantity of wind sound signals picked up by the microphone, to reduce wind noise. To be specific, some wind sound signals that enter the headset may not be picked up by the microphone, but flow out of the headset through the microphone sound inlet channels communicating with each other. In other words, the "microphone sound inlet channel" in this embodiment of this application may be used to pick up the normal voice signal by the microphone, and may also be used by the wind sound signal to directly flow out of the headset without being picked up by the microphone.

As described above, in the wireless headset provided in this embodiment of this application, the charging unit 26 is in a form of a charging contact, one end of the charging unit 26 is connected to the flexible printed circuit 24, and the other end needs to be exposed to the bottom housing 14 to be in contact with the contacts in the charging case. The charging contact needs to pass through the waterproof and dustproof film 232, the bottom housing 14, and the like to be exposed to the headset. Therefore, when the charging contact is disposed, how to arrange and lay out a plurality of elements in small space needs to be fully considered, to ensure that mounting positions of the elements do not interfere with each other. For example, a connection position and a connection manner of the charging contact and the flexible printed circuit 24, hole positions and sizes of the plurality of sound inlet holes 141 on the bottom housing 14, and a position and a size of a hole on the waterproof and dustproof film 232 need to be designed. Further, it is necessary to ensure that a position of a hole on the bottom housing 14 corresponds to the position of the hole on the waterproof and dustproof film 232, ensure an assembling gap between the charging contact and the hole on the bottom housing 14, and ensure sealing, so as to ensure that dust and water do not enter the headset from the assembling gap.

An embodiment of this application provides another wireless headset. Based on the wireless headset shown in FIG. 1, in the another wireless headset, the bottom housing 14 is used as an electrode to replace the charging contact. Due to a design of omitting the charging contact, the hole for protrusion of the charging contact from the headset does not need to be disposed on the flexible printed circuit 24, the waterproof and dustproof film 232, and the bottom housing 14. Therefore, this can reduce structure design complexity and process implementation complexity, and increase utilization of space inside the headset housing 1, so that a structure of the wireless headset is more compact, and the wireless headset is charged in a portable manner. Similar to the wireless headset 100 shown in FIG. 1, a plurality of sound inlet holes are disposed on the bottom housing 14, and wind noise can also be reduced.

Figure 5:
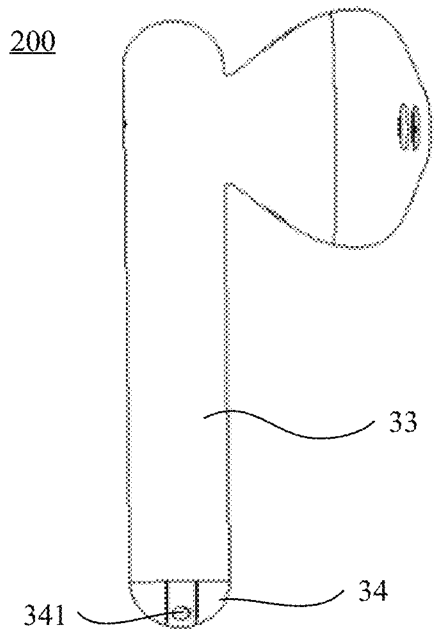
FIG. 5 is a schematic diagram of a structure of a wireless headset according to another embodiment of this application.

FIG. 5 is a schematic diagram of a structure of a wireless headset according to another embodiment of this application. As shown in FIG. 5, similar to the wireless headset 100, a wireless headset 200 also includes a headset housing and a headset assembly accommodated in the headset housing. The headset housing of the wireless headset 200 includes a headset handle 33 (corresponding to the headset handle 13) and a bottom housing 34 (corresponding to the bottom housing 14). A part or all of the bottom housing 34 is made of a conductor material (for example, a metal material), to be directly in contact with a contact in a charging case to charge a battery of the headset. Structures of the wireless headset 100 and the wireless headset 200 are similar. The following describes a difference between the wireless headset 200 and the wireless headset 100. For a part that is not described in detail, refer to the foregoing related descriptions of the wireless headset 100.

To reduce wind noise, a plurality of sound inlet holes 341 (corresponding to the sound inlet holes 141) are disposed on the bottom housing 34. The sound inlet hole 341 is used to communicate the outside of the headset with a cavity inside the headset, so that an external sound signal enters the headset through the sound inlet hole 341, and is picked up by a microphone in the cavity inside the headset. It should be understood that a person skilled in the art may adaptively design and select a quantity, shapes, and disposition positions of the plurality of sound inlet holes 341 based on an actual requirement.

In some implementations, a quantity of sound inlet holes 341 may be set, for example, to 2, 3, 4, 6, or a larger value. The plurality of sound inlet holes 341 may be disposed at any position on the bottom housing 34. The plurality of sound inlet holes 341 may be designed, so that when a user talks in each direction, a sound signal of the user can enter the headset through the sound inlet hole 341, to be picked up by the microphone. The plurality of sound inlet holes 341 form microphone sound inlet channels communicating with each other. With a structure design of the plurality of sound inlet holes and the plurality of microphone sound inlet channels communicating with each other, after a wind sound signal enters a structure sound inlet channel in the bottom housing 34, partial energy can be distributed through another sound inlet hole, so that energy of wind sound acting on a diaphragm of the microphone can be reduced, to reduce wind noise picked up by the microphone, and reduce wind noise. It should be understood that a structure of the wireless headset 200 in FIG. 5 is merely an example, and a shape of the bottom housing 34 and a disposition quantity and disposition positions of sound inlet holes 341 are also merely an example. This is not limited in this embodiment of this application.

It may be understood that the bottom housing 34 and the headset handle 33 may be two independent components. During assembling, the bottom housing 34 and the headset handle 33 are connected through clamping, to form the cavity inside the headset. In some other implementations, the bottom housing 34 and the headset handle 33 may be one component, that is, the bottom housing 34 and the headset handle 33 may be an integral structure, for example, may be formed through injection molding. The bottom housing 34 may be in any simple or complex shape, and a thickness of the bottom housing 34 may be even or uneven. A cross-sectional shape of a cavity formed by the bottom housing 34 in a direction of a bottom view may be a square, an oval, a circle, a shape obtained by combining two semicircles and a square, or the like. The cavity formed by the bottom housing 34 may be hemispherical, arc-shaped, cylindrical, or the like. This is not specifically limited in this embodiment of this application.

For brevity, when no special description is provided, for the wireless headset 200 shown in FIG. 5 and the headset assembly in the following embodiment, refer to the foregoing related descriptions of the headset assembly 2 of the wireless headset 100. In some implementations, a same reference numeral as that of the headset assembly of the wireless headset 100 is used for description. The following is described in detail with reference to FIG. 6 to FIG. 12.

Figure 6:
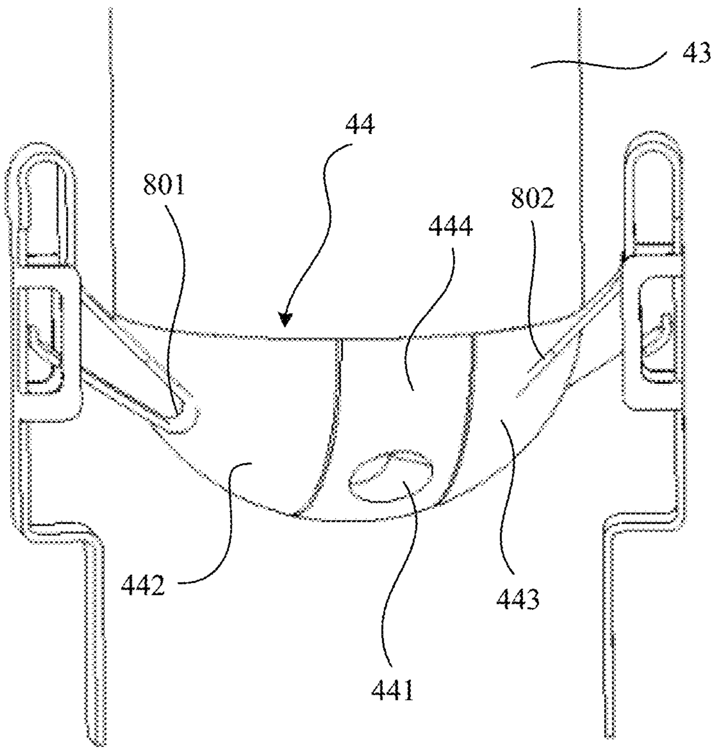
FIG. 6 is a schematic diagram of a structure of a wireless headset according to an embodiment of this application.

FIG. 6 is a schematic diagram of a structure of a wireless headset according to an embodiment of this application. A bottom housing 44 has charging terminals, and the charging terminals include a positive electrode charging terminal and a negative electrode charging terminal. The positive electrode charging terminal and the negative electrode charging terminal are separated by using an insulating material. In other words, the bottom housing may be used as a positive charging electrode and a negative charging electrode. Specifically, a headset housing includes a bottom housing, the bottom housing includes a first bottom housing part and a second bottom housing part that are separated by using an insulating material, the first bottom housing part is the positive charging electrode, and the second bottom housing part is the negative charging electrode.

Refer to FIG. 6. For ease of understanding and description, in this embodiment of this application, an example in which an outer surface of the bottom housing 44 is hemispherical and the bottom housing 44 and a headset handle 43 are connected through clamping is used for description. As shown in FIG. 6, the bottom housing 44 includes a first bottom housing part 442, a second bottom housing part 443, and a third bottom housing part 444. Materials of the first bottom housing part 442 and the second bottom housing part 443 are conductor materials such as metal materials (such as copper, iron, aluminum, gold, and alloy), and the third bottom housing part 444 is of an insulating material such as a plastic material. The third bottom housing part 444 is located between the first bottom housing part 442 and the second bottom housing part 443. The third bottom housing part 444 may separate the first bottom housing part 442 and the second bottom housing part 443. In this embodiment of this application, the first bottom housing part 442 and the second bottom housing part 443 are respectively used as the positive electrode and the negative electrode of the wireless headset, and correspond to a positive electrode and a negative electrode of a charging spring in a charging case. For example, the first bottom housing part 442 may be the positive charging electrode, and corresponds to a positive electrode charging spring 801 in the charging case. The second bottom housing part 443 is the negative charging electrode, and corresponds to a negative electrode charging spring 802 in the charging case. Alternatively, the first bottom housing part 442 may be the negative charging electrode, and corresponds to a negative electrode charging spring 801 in the charging case. The second bottom housing part 443 is the positive charging electrode, and corresponds to a positive electrode charging spring 802 in the charging case. In other words, a bottom housing part that is on the bottom housing 44 and that is used as the positive charging electrode corresponds to the charging spring that is in the charging case and that is used as the positive electrode, and a bottom housing part that is on the bottom housing 44 and that is used as the negative charging electrode corresponds to the charging spring that is in the charging case and that is used as the negative electrode. A person skilled in the art may correspondingly design each part of the bottom housing 44 based on a charging circuit and the positive electrode and the negative electrode of the charging spring in the charging case. It should be understood that, in this embodiment of this application, the charging spring is merely an example. A component disposed in the charging case to charge the wireless headset is not limited to the charging spring, and may be a charging contact, a charging block, a charging surface, and a component that is in another shape and that can conduct a current. This is not specifically limited in this embodiment of this application.

In an implementation solution, a recess part may be disposed on an outer wall of the bottom housing 44, and the recess part may be in contact with the charging component in the charging case through cooperation, for example, a charging spring, a charging contact, a charging block, and a charging surface. The recess part may be further configured to position and/or limit the wireless headset, to limit a position of the wireless headset in the charging case. The recess part may be in a shape of a groove, a hole, a concave surface, or the like. This is not limited in this embodiment of this application. It should be understood that the recess part should be of the conductor material.

One or more sound inlet holes 441 may be disposed on the bottom housing 44. In an implementation solution, if only one sound inlet hole 441 is disposed on the bottom housing 44, the sound inlet hole 441 may be disposed on the third bottom housing part 444 (namely, the insulating material), or may be disposed on the first bottom housing part 442 or the second bottom housing part 443. This is not specifically limited in this embodiment of this application. In this implementation solution, one sound inlet hole 441 is disposed on the bottom housing 44. Although a wind noise reduction effect is general, because the bottom housing is used as the positive charging electrode and the negative charging electrode, structure design complexity and process implementation complexity can be reduced. In another implementation solution, if a plurality of sound inlet holes 441 are disposed on the bottom housing 44, the plurality of sound inlet holes 441 may be all disposed on any one of the first bottom housing part 442, the second bottom housing part 443, and the third bottom housing part 444. Optionally, the plurality of sound inlet holes 441 are disposed on the insulating material (namely, the third bottom housing part 444). For example, if a quantity of the plurality of sound inlet holes 441 is 2, the two sound inlet holes may be both disposed on the third bottom housing part 444. The plurality of sound inlet holes 441 may be disposed on at least two of the first bottom housing part 442, the second bottom housing part 443, and the third bottom housing part 444. For example, if a quantity of the plurality of sound inlet holes 441 is 3, one sound inlet hole may be disposed on each of the first bottom housing part 442, the second bottom housing part 443, and the third bottom housing part 444. This is not specifically limited in this embodiment of this application.

In an implementation solution, the plurality of sound inlet holes 441 may be evenly disposed on the bottom housing, so that a voice signal in each direction can be picked up by the wireless headset, to improve call experience.

In an implementation solution, the plurality of sound inlet holes 441 include two sound inlet holes, and axes of the two sound inlet holes overlap. Wind generally has a direction. Therefore, when the axes of the two sound inlet holes overlap, the wind sound signal is allowed to enter the headset from one of the sound inlet holes and then flow out from the other sound inlet hole. This has a better attenuation effect on the wind sound signal and a better wind noise reduction effect.

It should be understood that ratios of the first bottom housing part 442, the second bottom housing part 443, and the third bottom housing part 444 to the bottom housing 44 of the headset may be the same. Two of the ratios may be the same (for example, the ratio of the first bottom housing part 442 to the bottom housing 44 of the headset is the same as the ratio of the second bottom housing part 443 to the bottom housing 44 of the headset), or the ratios may be totally different. This is not specifically limited in this embodiment of this application. Shapes of the first bottom housing part 442, the second bottom housing part 443, and the third bottom housing part 444 are not specifically limited in this embodiment of this application either.

It should be further understood that materials of the first bottom housing part 442 and the second bottom housing part 443 may be the same or different. For example, a same metal conductive material may be used for the first bottom housing part 442 and the second bottom housing part 443, to ensure a stable charging process. Different metal conductive materials may be used for the first bottom housing part 442 and the second bottom housing part 443. This is not limited in this embodiment of this application. The third bottom housing part 444 may include one insulating material or a plurality of insulating materials. This is not specifically limited in this embodiment of this application.

It should be noted that an example in which the outer surface of the bottom housing 44 is hemispherical is used for description in this embodiment of this application. In another implementation, the bottom housing 44 may be in any other shape. For example, the outer surface (or referred to as the outer wall) of the bottom housing 44 is arc-shaped, cylindrical, square, conical, oval, curved, or the like. A specific structure used for charging is similar to a structure existing when the bottom housing 44 is hemispherical. Details are not described herein again.

In an implementation solution, the bottom housing 44 and the headset handle 43 may be two independent components, or may be one component integrally formed through injection molding.

In an implementation solution, the charging springs 801 and 802 may be in a form of a charging contact, a charging block, a charging surface, and the like.

Figure 7:
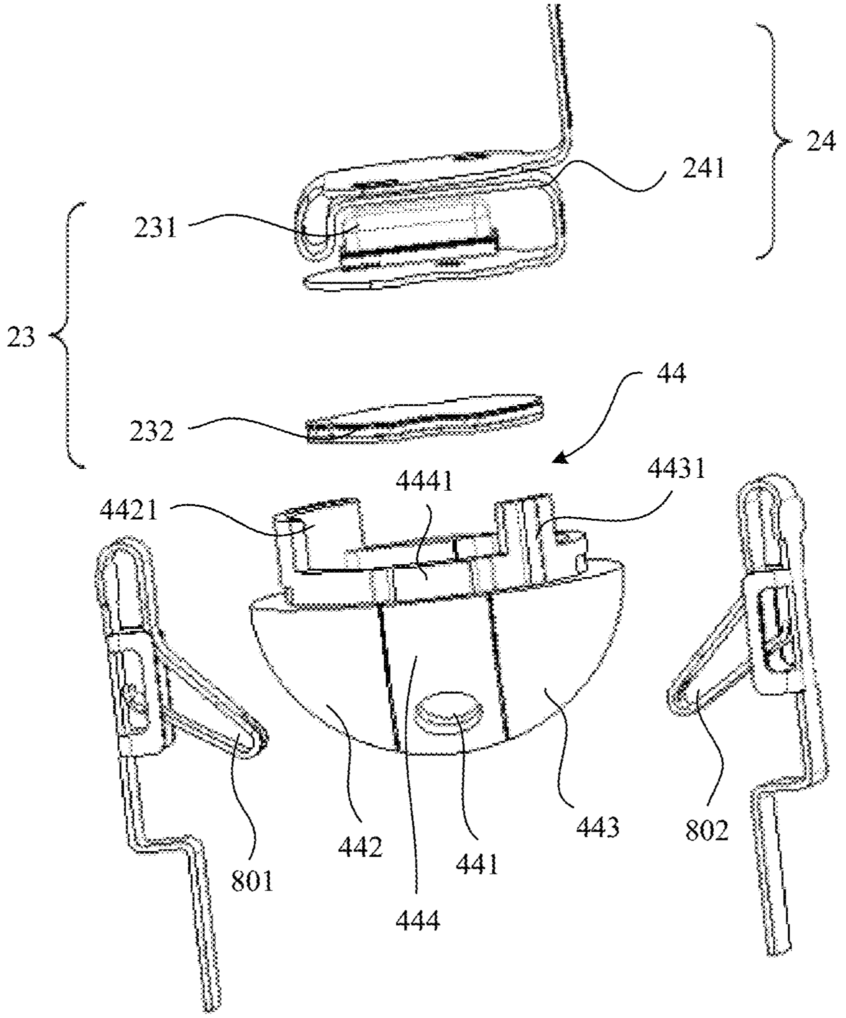
FIG. 7 is a schematic exploded view of a wireless headset according to an embodiment of this application.

A headset assembly in a cavity inside the headset is similar to that in the foregoing descriptions, and details are not described herein again. With reference to FIG. 7, the following describes corresponding differences of some elements in the bottom housing 44 provided in FIG. 6.

FIG. 7 is a schematic exploded view of a wireless headset according to an embodiment of this application. Specifically, FIG. 7 may be a schematic exploded view of the wireless headset shown in FIG. 6. Refer to FIG. 7. The first bottom housing part 442 includes a first connection part 4421, configured to be electrically connected to a flexible printed circuit FPC 24. For example, the first connection part 4421 and the FPC 24 (or a first FPC part 241) may be connected through welding or fusion or by using a spring. Ultrasonic welding or the like may be used as welding. The second bottom housing part 443 includes a second connection part 4431, configured to be electrically connected to the flexible printed circuit FPC 24. For example, the second connection part 4431 and the FPC 24 (or the first FPC part 241) may be connected through welding or fusion or by using a spring. Ultrasonic welding or the like may be used as welding. The first connection part 4421 is not in direct contact with the second connection part 4431. A position at which the first connection part 4421 is electrically connected to the FPC 24 and a position at which the second connection part 4431 is electrically connected to the FPC 24 respectively correspond to the first bottom housing part 442 that is used as the positive charging electrode or the negative charging electrode and the second bottom housing part 443 that is used as the positive charging electrode or the negative charging electrode. In other words, when the first bottom housing part 442 is used as the positive charging electrode, the first connection part 4421 is connected to a positive electrode of the FPC 24; or when the second bottom housing part 443 is used as the positive charging electrode, the second connection part 4431 is connected to a negative electrode of the FPC 24, to form a complete loop, and vice versa. When a battery 25 needs to be charged, the headset may be placed inside the charging case, and the first bottom housing part 442 and the second bottom housing part 443 are correspondingly in contact with the positive electrode charging spring 801 and the negative electrode charging spring 802 in the headset case, to form a complete charging loop.

In an implementation solution, an inner wall of the first connection part 4421 is welded to the first FPC part 241, and an inner wall of the second connection part 4431 is welded to the first FPC part 241. In some implementations, the first connection part 4421 and the second connection part 4431 may be located on an inner wall of the bottom housing 44. In other words, the first FPC part 241 may be welded to the inner wall of the bottom housing 44. In other words, the inner wall of the bottom housing may be connected to the flexible printed circuit. For example, inner walls of the first bottom housing part 442 and the second bottom housing part 443 each are electrically connected to the flexible printed circuit 24. In this way, integrity of a waterproof and dustproof film and the like inside the headset can be ensured, and a design of disposing a hole on the waterproof and dustproof film is not required, to simplify a structure design.

In an implementation solution, if the headset handle 43 and the bottom housing 44 are connected through clamping, the first connection part 4421 and the second connection part 4431 may be used as a part at which the headset handle 43 is clamped to the bottom housing 44. The first connection part 4421 and the second connection part 4431 extend in a direction of a rear housing along an inner wall of the headset handle 43.

In an implementation solution, the third bottom housing part 444 may include a third connection part 4441, configured to isolate the first connection part 4421 from the second connection part 4431. When the headset handle 43 and the bottom housing 44 are connected through clamping, the third connection part 4441 may be used as the part at which the headset handle 43 is clamped to the bottom housing 44. The third connection part 4441 extends in the direction of the rear housing along the inner wall of the headset handle 43.

Figure 8:
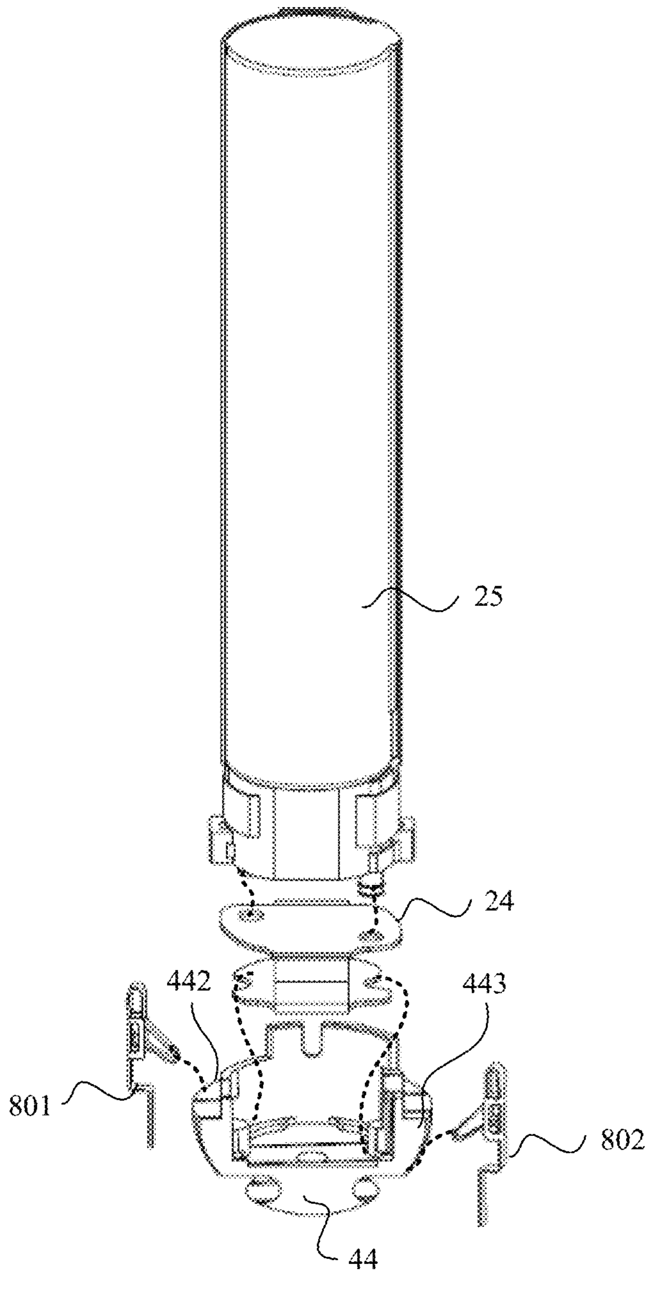
FIG. 8 is a schematic diagram of a connection relationship between some headset assemblies according to an embodiment of this application.

FIG. 8 is a schematic diagram of a connection relationship between some headset assemblies of a wireless headset according to an embodiment of this application. As shown in FIG. 8, the bottom housing 44 in this embodiment of this application includes the first bottom housing part 442 and the second bottom housing part 443 that are separated by using the insulating material. For example, the first bottom housing part 442 is the positive charging electrode (the positive electrode charging terminal) and the second bottom housing part 443 is the negative charging electrode (the negative electrode charging terminal). The first bottom housing part 442 and the second bottom housing part 443 each are electrically connected to the flexible printed circuit 24, and a positive electrode and a negative electrode of the battery 25 each are also electrically connected to the flexible printed circuit 24. When the battery 25 is charged, a charging current flows from the charging spring 801 to the first bottom housing part 442 (the positive charging electrode), and then flows from the first bottom housing part 442 to the positive electrode of the battery 25 by using a charging circuit in the flexible printed circuit 24. The charging current flows from the negative electrode of the battery 25 to the second bottom housing part 443 (the negative charging electrode) by using the charging circuit in the flexible printed circuit 24, and then flows from the second bottom housing part 443 back to the charging spring 802, to finally form a charging loop to charge the battery 25. For example, a connection relationship among the bottom housing 44, the flexible printed circuit 24, and the battery 25 is shown by a dashed line in FIG. 8.

The first bottom housing part 442 and the second bottom housing part 443 included in the bottom housing 44 are respectively used as the positive charging electrode and the negative charging electrode, are electrically connected to the flexible printed circuit 24, and do not need to pass through the waterproof and dustproof film 232 to be exposed to the headset. Therefore, no hole needs to be disposed on the waterproof and dustproof film 232, and a process of disposing a hole on the waterproof and dustproof film 232, aligning the charging contact with the hole, and the like are omitted. This simplifies a manufacturing and assembling process, reduces structure complexity and process implementation complexity, and increases space utilization of the cavity formed by the bottom housing. The following describes a mounting position of the headset assembly in the bottom housing with reference to the accompanying drawings. Details are not described herein.

Figure 9:
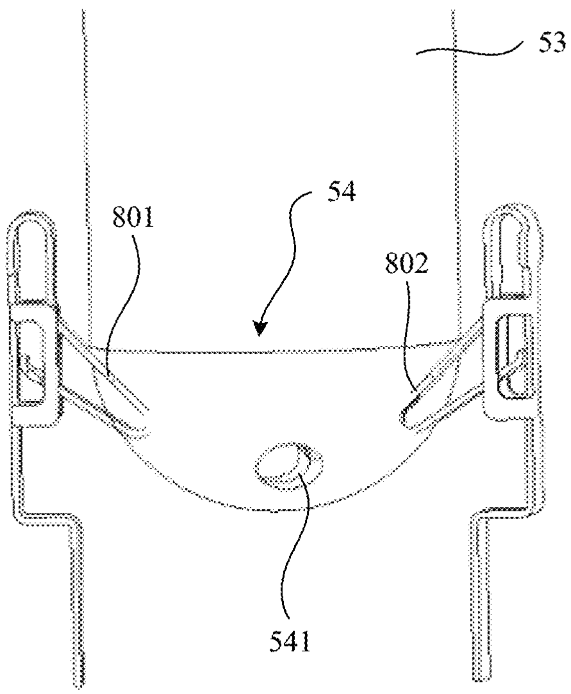
FIG. 9 is a schematic diagram of a structure of a wireless headset according to another embodiment of this application.

FIG. 9 is a schematic diagram of a structure of a wireless headset according to another embodiment of this application. A bottom housing has a charging terminal. The charging terminal is one of a positive electrode charging terminal or a negative electrode charging terminal, and the other of the positive electrode charging terminal or the negative electrode charging terminal is separated from the bottom housing. In other words, if the bottom housing may be used as a positive charging electrode, a negative charging electrode is separated from the bottom housing, namely, the negative charging electrode is not on the bottom housing or is not part of the bottom housing. Alternatively, if the bottom housing may be used as a negative charging electrode, a positive charging electrode is separated from the bottom housing, namely, the positive charging electrode is not on the bottom housing or is not part of the bottom housing. Specifically, a headset housing includes the bottom housing, the bottom housing is one of the positive charging electrode and the negative charging electrode, and the other of the positive charging electrode and the negative charging electrode is separated from the bottom housing.

Refer to FIG. 9. For ease of understanding and description, in this embodiment of this application, an example in which an outer surface of a bottom housing 54 is hemispherical and the bottom housing 54 and a headset handle 53 are connected through clamping is used for description. As shown in FIG. 9, all of the bottom housing 54 in this embodiment of this application is of a conductor material such as a metal material, and the entire bottom housing 54 is used as the positive charging electrode or the negative charging electrode. Alternatively, a part of the bottom housing 54 may be of a conductor material, and the part of bottom housing of the conductor material is used as the positive charging electrode or the negative charging electrode. It should be understood that, either when all of the bottom housing 54 is of the conductor material and is used as one of the positive charging electrode and the negative charging electrode or when a part of the bottom housing 54 is of the conductor material and is used as one of the positive charging electrode and the negative charging electrode, in this embodiment of this application, it may be understood that the bottom housing is used one of the positive charging electrode and the negative charging electrode, and corresponds to charging springs 801 and 802 in a charging case, namely, one charging electrode corresponds to the charging springs 801 and 802 in the charging case. In other words, when the bottom housing 54 is used as the positive charging electrode, the charging springs 801 and 802 in the charging case are positive electrode charging springs. When the bottom housing 54 is used as the negative charging electrode, the charging springs 801 and 802 in the charging case are negative electrode charging springs. During charging, the bottom housing 54 is in contact with the charging springs 801 and 802 in the charging case. FIG. 9 shows an example of two charging springs 801 and 802. However, it should be understood that there may be one or more charging springs in the charging case, for example, one, three, four, or more charging springs. The plurality of charging springs help improve stability existing when the headset is placed inside the charging case. A manner of a charging contact may be used for the other of the positive charging electrode and the negative charging electrode. The charging contact is disposed on another part of the headset housing, for example, on the front housing 11, the rear housing 12, or the headset handle 13 shown in FIG. 1 or FIG. 2(*a*) and FIG. 2(*b*). One end of the charging contact is connected to an FPC 24, and the other end protrudes from the headset housing, to be connected to a metal connector pin at a corresponding position in the charging case. When the headset is placed inside the charging case, the bottom housing 54 is in contact with the charging springs 801 and 802, and the charging contact of the wireless headset is in contact with the metal connector pin at the corresponding position in the charging case, to form a charging loop. When the bottom housing 54 is used as the positive charging electrode, the charging contact is used as the negative charging electrode. Alternatively, when the bottom housing 54 is used as the negative charging electrode, the charging contact is used as the positive charging electrode.

In an implementation solution, the bottom housing 54 is one of the positive charging electrode and the negative charging electrode, and the other of the positive charging electrode and the negative charging electrode is disposed on the rear housing 12.

In an implementation, a recess part may be disposed on an outer wall of the bottom housing 54, and the recess part may be in contact with the charging component in the charging case through cooperation, for example, a charging spring, a charging contact, a charging block, and a charging surface. The recess part may be further configured to position and/or limit the wireless headset, to limit a position of the wireless headset in the charging case. The recess part may be in a shape of a groove, a hole, a concave surface, or the like. This is not limited in this embodiment of this application. It should be understood that the recess part should be of the conductor material.

One or more sound inlet holes 541 are disposed on the bottom housing 54. A disposition position of the one or more sound inlet holes 541 is not specifically limited in this embodiment of this application. For detailed descriptions, refer to the foregoing related descriptions of the bottom housing 44. Details are not described herein again.

It should be noted that an example in which the outer surface of the bottom housing 54 is hemispherical is used for description in this embodiment of this application. In another implementation, the bottom housing 54 may be in another shape. For example, the outer surface of the bottom housing 54 is arc-shaped, cylindrical, square, conical, oval, curved, or the like. A specific structure used for charging is similar to a structure existing when the bottom housing 54 is hemispherical. Details are not described herein again.

In an implementation solution, the bottom housing 54 and the headset handle 53 may be two independent components, or may be one component integrally formed through injection molding.

In an implementation solution, the charging springs 801 and 802 may be in a form of a charging contact, a charging block, a charging surface, and the like of a metal material.

Figure 10:
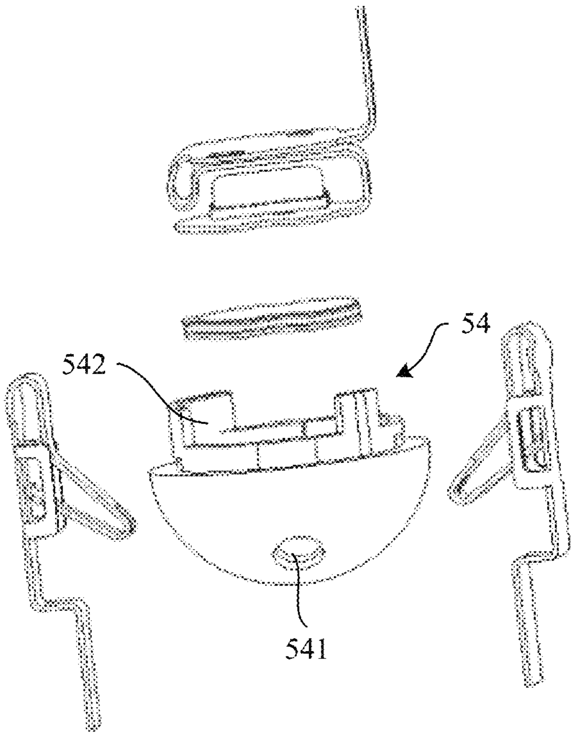
FIG. 10 is a schematic exploded view of a wireless headset according to another embodiment of this application.

A headset assembly in a cavity inside the headset is similar to that in the foregoing descriptions, and details are not described herein again. With reference to FIG. 10, the following describes corresponding differences of some elements in the bottom housing 54 provided in FIG. 9.

FIG. 10 is a schematic exploded view of a wireless headset according to another embodiment of this application. Specifically, FIG. 10 may be a schematic exploded view of the wireless headset shown in FIG. 9. Refer to FIG. 10. The bottom housing 54 includes a fourth connection part 542, configured to be electrically connected to the flexible printed circuit FPC 24. For example, the fourth connection part 542 and the FPC 24 (or a first FPC part 241) may be connected through welding or fusion or by using a spring. Ultrasonic welding or the like may be used as welding.

In an implementation solution, an inner wall of the fourth connection part 542 is welded to the first FPC part 241. In some implementations, the fourth connection part 542 is located on an inner wall of the bottom housing 54. In other words, the first FPC part 241 may be welded to the inner wall of the bottom housing 54. In other words, the inner wall of the bottom housing may be connected to the flexible printed circuit. In this way, integrity of a waterproof and dustproof film and the like inside the headset can be ensured, and a design of disposing a hole on the waterproof and dustproof film is not required, to simplify a structure design.

In an implementation solution, if the headset handle 53 and the bottom housing 54 are connected through clamping, the fourth connecting part 542 may be used as a part at which the headset handle 53 is clamped to the bottom housing 54. The fourth connection part 542 extends in a direction of a rear housing along an inner wall of the headset handle 53. The headset assembly of the wireless headset provided in this embodiment of this application is similar to that in the foregoing descriptions. For details, refer to the foregoing descriptions. Details are not described herein again.

Figure 11:
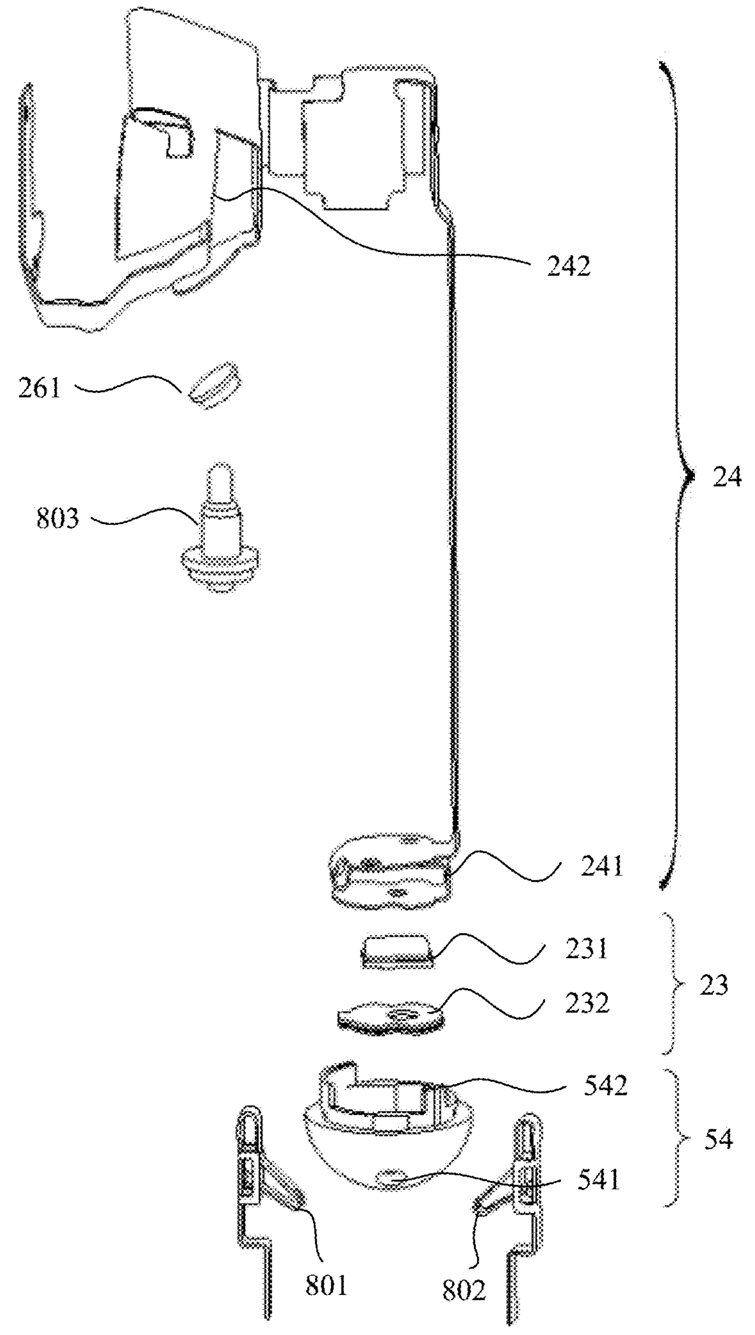
FIG. 11 is a schematic exploded view of a wireless headset according to another embodiment of this application.

FIG. 11 is a schematic exploded view of a wireless headset according to another embodiment of this application. For example, the bottom housing shown in the figure may be the bottom housing 54 shown in FIG. 9 or FIG. 10. The bottom housing 54 is used as one (for example, the positive charging electrode or the negative charging electrode) of the positive charging electrode and the negative charging electrode, and the fourth connection part 542 and the first FPC part 241 may be connected through welding. A charging contact 261 is disposed at a bottom position (for example, a position that is on the rear housing 12 and that is close to a bending part shown in FIG. 1) of the head of the wireless headset. One end of the charging contact 261 is connected to the other end of the FPC 24 (for example, a second FPC part 242), and the other end of the charging contact 261 protrudes from the headset housing. After the wireless headset is placed inside the charging case, the bottom housing 54 is in contact with the charging springs 801 and 802 in the headset case, and the charging contact 261 is in contact with a charging connector pin 803 in the headset case, to form a loop. For example, the headset case may charge a battery of the headset.

Figure 12:
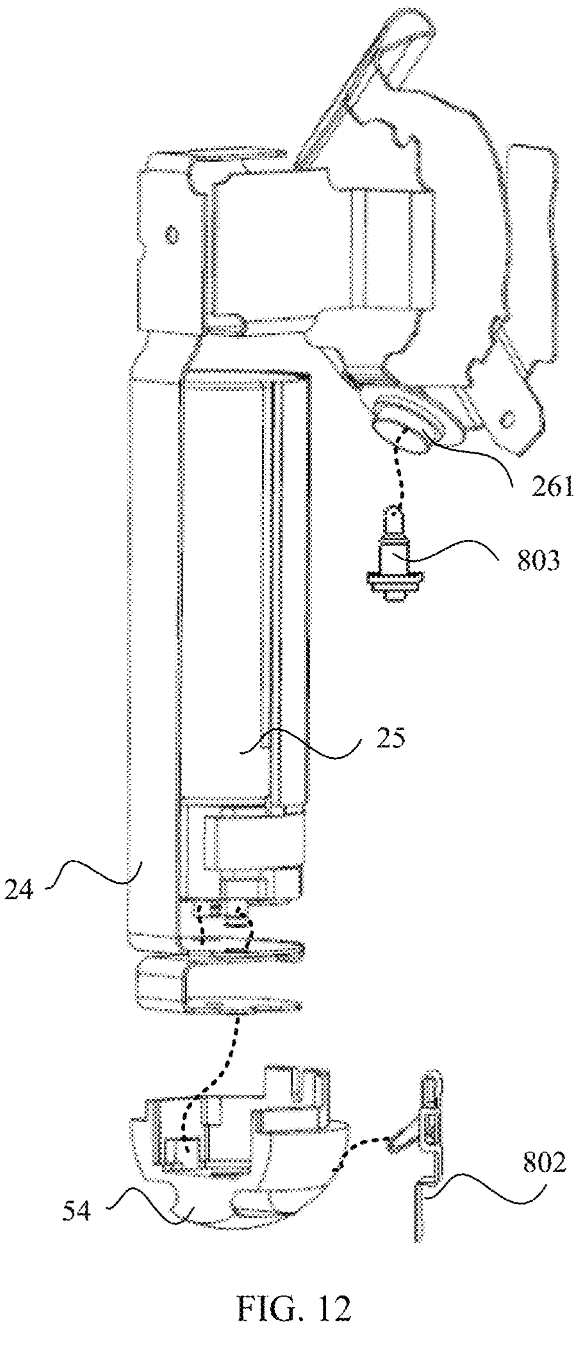
FIG. 12 is a schematic diagram of a connection relationship between some headset assemblies according to another embodiment of this application.

FIG. 12 is a schematic diagram of a connection relationship between some headset assemblies of a wireless headset according to another embodiment of this application. As shown in FIG. 12, the bottom housing 54 in this embodiment of this application includes one of the positive charging electrode and the negative charging electrode. An example in which the bottom housing 54 includes the positive charging electrode (namely, the bottom housing 54 is the positive charging electrode) is used. The negative charging electrode is separated from the bottom housing 54. The positive charging electrode and the negative charging electrode each are electrically connected to the flexible printed circuit 24, and a positive electrode and a negative electrode of the battery 25 each are electrically connected to the flexible printed circuit 24. When the battery 25 is charged, a charging current flows from the charging spring 802 to the bottom housing 54 (namely, the positive charging electrode), and then flows from the bottom housing 54 to the positive electrode of the battery 25 by using a charging circuit in the flexible printed circuit 24. The charging current flows from the negative electrode of the battery 25 to the charging contact 261 (namely, the negative charging electrode) by using the charging circuit in the flexible printed circuit 24, and then flows from the charging contact 261 back to the charging connector pin 803, to finally form a charging loop to charge the battery 25. For example, a connection relationship among the bottom housing 54, the flexible printed circuit 24, and the battery 25 is shown by a dashed line in FIG. 12. The battery 25 is electrically connected to the flexible printed circuit 24, one end of the flexible printed circuit 24 is electrically connected to the bottom housing 54, and the other end of the flexible printed circuit 24 is electrically connected to the other (for example, the charging contact 261) of the positive charging electrode and the negative charging electrode of the wireless headset.

The bottom housing 54 is used as one charging electrode, and does not need to pass through the waterproof and dustproof film 232 to be exposed to the headset. Therefore, no hole needs to be disposed on the waterproof and dustproof film 232, and a process of disposing a hole on the waterproof and dustproof film 232, aligning the charging contact with the hole, and the like are omitted. This simplifies a manufacturing and assembling process, reduces structure complexity and process implementation complexity, and increases space utilization of the cavity formed by the bottom housing. In addition, the bottom housing is used as one charging electrode, and the conductor material may be used for all of the bottom housing, to simplify a manufacturing process of the housing.

Figure 13:
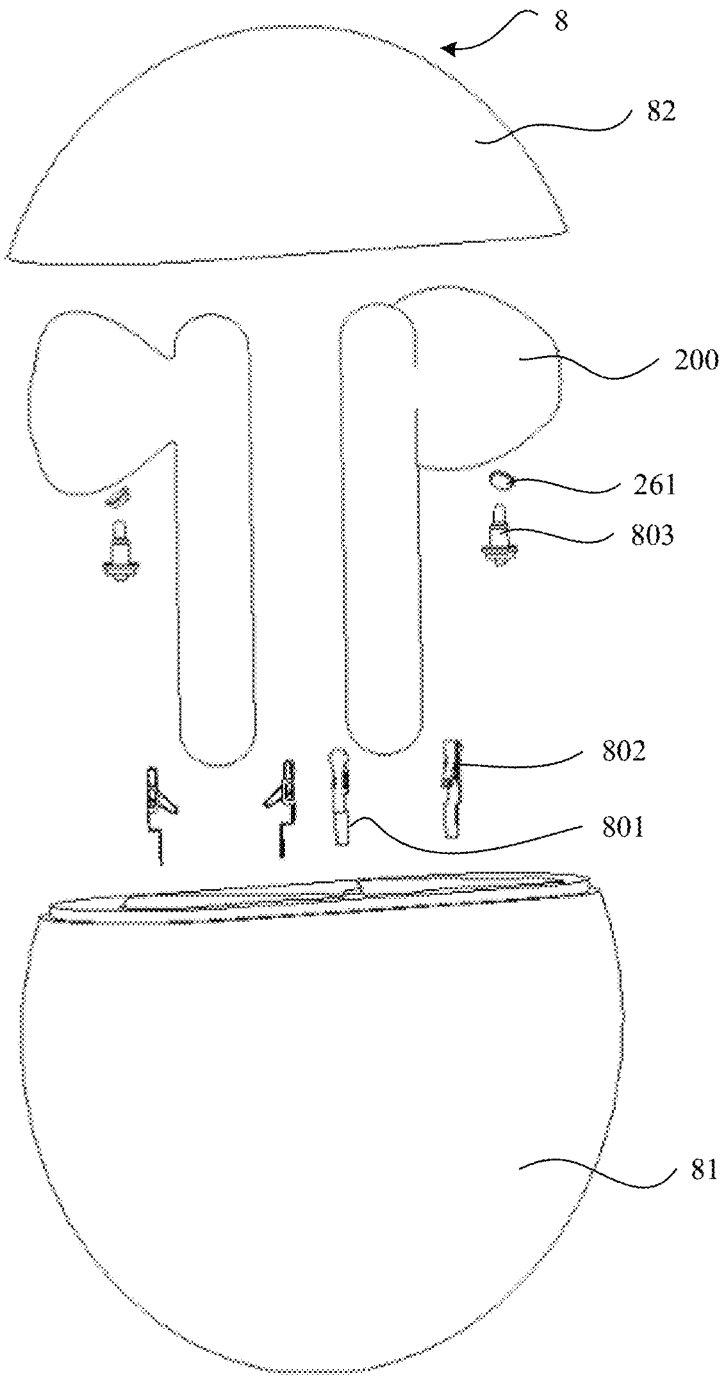
FIG. 13 is a schematic exploded view of a wireless headset that is placed inside a charging case according to an embodiment of this application.
Figure 14:
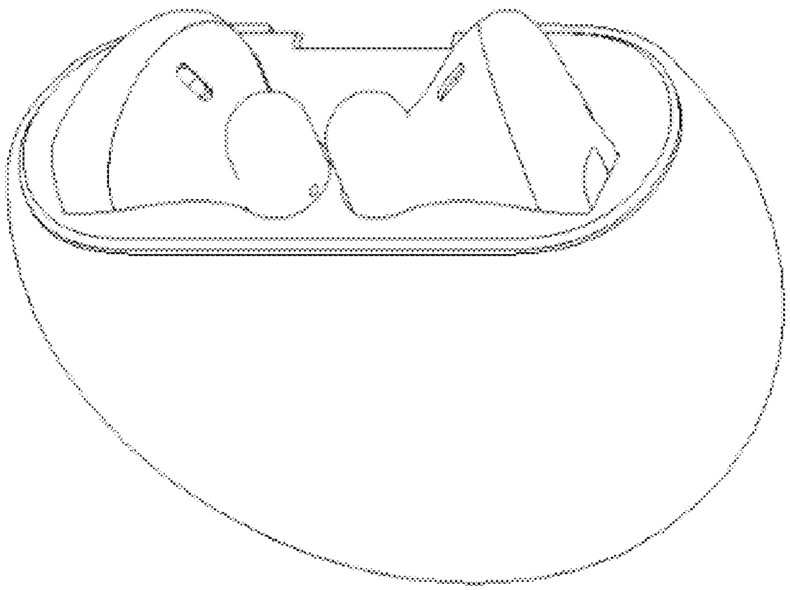
FIG. 14 is a schematic diagram of a wireless headset that is placed inside a charging case according to an embodiment of this application.
Figure 15:
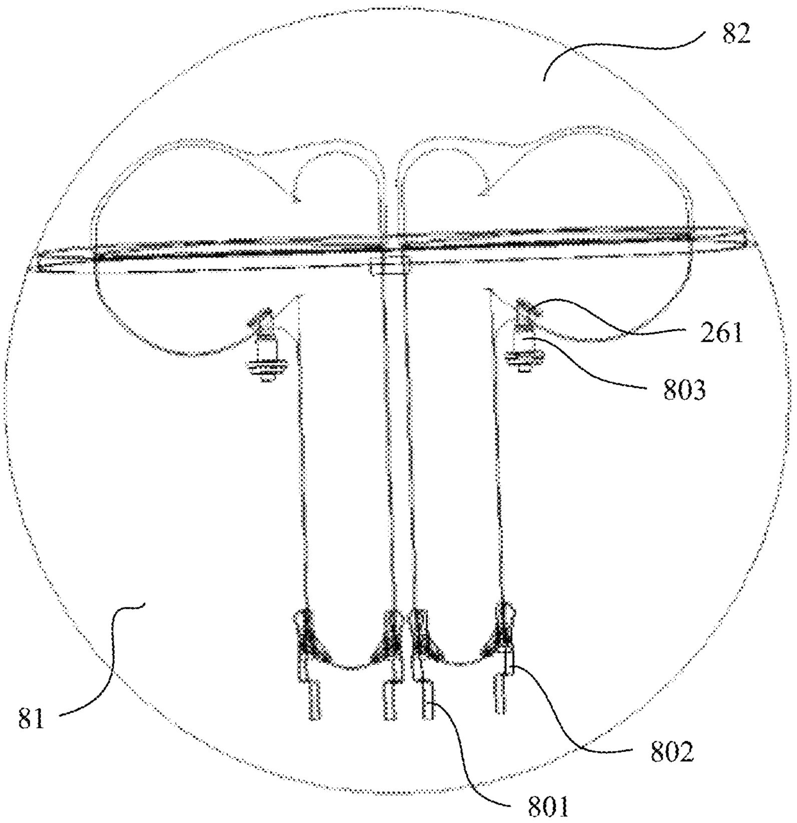
FIG. 15 is a schematic perspective view of a wireless headset that is placed inside a charging case according to an embodiment of this application.

FIG. 13 is a schematic exploded view of a wireless headset that is placed inside a charging case according to an embodiment of this application. As shown in FIG. 13, a charging case 8 may include a charging case body 81 and a charging case lid 82. The charging case body 81 is provided with accommodation space for accommodating the wireless headset, and the charging case lid 82 is configured to cover the accommodation space. The charging case body 81 and the charging case lid 82 may be rotatably connected or connected through clamping, that is, the charging case body 81 and the charging case lid 82 may be rotated relative to each other, or the charging case lid 82 may be separated from the charging case body 81. The charging case 8 may accommodate two wireless headsets: a left headset and a right headset. In some implementations, one wireless headset may be used as the foregoing primary headset, and the other wireless headset may be used as the foregoing secondary headset, so that the primary headset and the secondary headset may be connected in a Bluetooth manner. Charging springs such as a charging spring 801 and a charging spring 802 are disposed in the accommodation space that is in the charging case body 81 and that is used to accommodate each wireless headset. In some implementations, if a bottom housing of the wireless headset is used as a positive charging electrode and a negative charging electrode, the charging spring 801 and the charging spring 802 may be respectively used as a positive electrode spring charging and a negative electrode charging spring, to correspond to the positive charging electrode and the negative charging electrode on the bottom housing. The positive electrode charging spring corresponds to the positive charging electrode on the bottom housing, and the negative electrode charging spring corresponds to the negative charging electrode on the bottom housing. In some other implementations, if a bottom housing of the wireless headset is used as one of a positive charging electrode and a negative charging electrode, for example, the bottom housing is used as the positive charging electrode or the negative charging electrode, the charging spring 801 and the charging spring 802 are both positive electrode charging springs or negative electrode charging springs, to correspond to one of the positive charging electrode and the negative charging electrode on the bottom housing. For example, if the bottom housing is the positive charging electrode, the charging spring 801 and the charging spring 802 are both positive electrode charging springs; or if the bottom housing is the negative charging electrode, the charging spring 801 and the charging spring 802 are both negative electrode charging springs. In addition, a charging connector pin 803 is further disposed in the accommodation space that is in the charging case body 81 and that is used to accommodate each wireless headset, to be in contact the other charging electrode (namely, a charging contact 261) of the headset. For details, refer to FIG. 14 and FIG. 15. FIG. 14 is a schematic diagram of a wireless headset that is placed inside a charging case. FIG. 15 is a schematic perspective view of a wireless headset that is placed inside a charging case.

Refer to FIG. 15. An embodiment of this application provides a charging case. The charging case includes a charging case body 81 and a charging case lid 82. The charging case body 81 is provided with accommodation space, used to accommodate the wireless headset. The charging case lid 82 is configured to cover the accommodation space. The accommodation space includes a bottom accommodation groove provided with a charging electrode, and the bottom accommodation groove is used to accommodate a bottom housing of the wireless headset. The charging electrode disposed in the bottom accommodation groove corresponds to a charging electrode on the bottom housing. If the bottom housing of the wireless headset is used as one of a positive charging electrode and a negative charging electrode, the accommodation space includes a bottom accommodation groove provided with a charging electrode corresponding to the bottom housing, that is, the charging electrode in the bottom accommodation groove is one of the positive electrode and the negative electrode. A charging electrode corresponding to the other of the positive charging electrode and the negative charging electrode on the bottom housing is not in the bottom accommodation groove. For example, if the bottom housing is the positive charging electrode, positive electrode charging springs 801 and 802 are disposed in the bottom accommodation groove in the charging case, and a negative charging electrode of the charging case is not disposed in the bottom accommodation groove. For example, the negative charging electrode may be disposed at a position that is in the accommodation space and that corresponds to the head of the wireless headset or corresponds to a headset handle. This is not specifically limited in this embodiment of this application. Specifically, the bottom housing is the positive charging electrode, and a negative charging electrode of the wireless headset may be disposed on a rear housing of the headset. In this case, an electrode corresponding to the negative charging electrode of the wireless headset is disposed at a position that is on the charging case and that corresponds to the rear housing. In some solutions, if the bottom housing of the wireless headset is used as a positive charging electrode and a negative charging electrode, for example, if a first bottom housing part is the positive charging electrode and a second bottom housing part is the negative charging electrode, the accommodation space includes a bottom accommodation groove provided with charging electrodes respectively corresponding to the first bottom housing part and the second bottom housing part. For example, when the bottom housing is used as the positive charging electrode and the negative charging electrode, a positive electrode charging spring 801 and a negative electrode charging spring 802 are disposed in the bottom accommodation groove in the charging case.

Figure 16A:
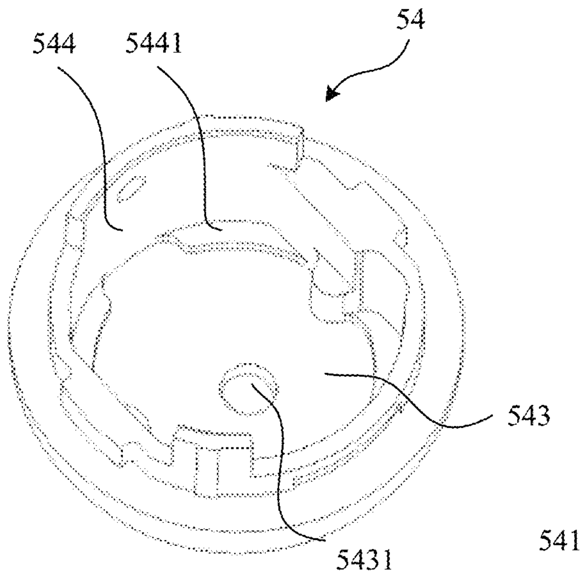
FIG. 16(*a*) and FIG. 16(*b*) are a schematic diagram of a structure of a bottom housing of a wireless headset according to an embodiment of this application.
Figure 16B:
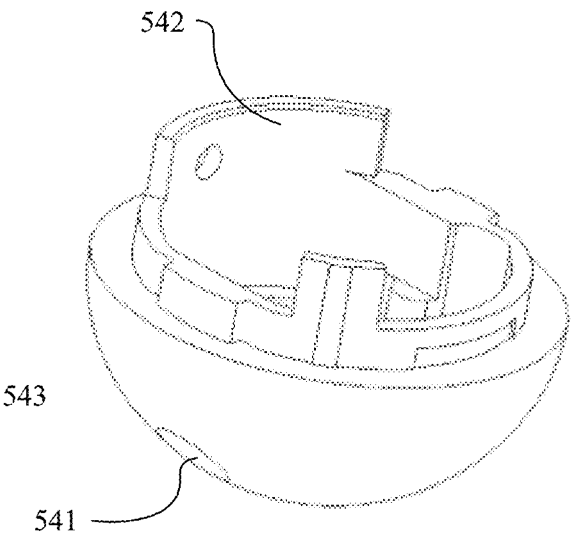

With reference to FIG. 5 to FIG. 15, the foregoing describes in detail content that the bottom housing of the wireless headset is used as a charging electrode. With reference to FIG. 16(*a*) to FIG. 19, the following describes in detail a connection relationship between the bottom housing and the headset assembly and a structure of the bottom housing based on the foregoing descriptions.

FIG. 16(*a*) and FIG. 16(*b*) are a schematic diagram of a structure of a bottom housing of a wireless headset according to an embodiment of this application. The bottom housing may be the bottom housing 44 shown in FIG. 6 or FIG. 7, or may be the bottom housing 54 shown in FIG. 9 or FIG. 10. For ease of understanding and description, the bottom housing 54 is used as an example for description in this embodiment of this application. Refer to FIG. 16(*a*) and FIG. 16(*b*). An outer surface of the bottom housing 54 is hemispherical or arc-shaped. In some other implementations, the outer surface of the bottom housing 54 may be any other simple, complex, single, or combined surface. For example, the outer surface of the bottom housing 54 may be oval, conical, cylindrical, prismatic, pyramidal, curved, or the like. An inner wall of the bottom housing 54 may include a bottom surface 543 and a side surface 544. The bottom surface 543 is roughly planar, and the side surface 544 may be curved or planar. In some implementations, the side surface 544 may be roughly perpendicular to the bottom surface 543.

A hole 5431 communicating with the outside of the headset is disposed on the bottom surface 543, and is used to allow an external sound signal to enter a microphone. In some implementations, a part between the bottom surface 543 of the inner wall of the bottom housing 54 and the outer surface of the bottom housing 54 may be filled with a bottom housing material. The part between the bottom surface 543 of the inner wall of the bottom housing 54 and the outer surface of the bottom housing 54 is an entity. In this case, the hole 5431 extends to the outside of the bottom housing 54 by using the entity part between the bottom surface 543 of the inner wall of the bottom housing 54 and the outer surface of the bottom housing 54, to form a sound inlet hole 541 on the outer surface of the bottom housing 54. In this way, a sound signal enters the headset through a sound channel between the sound inlet hole 541 and the hole 5431, to be picked up by the microphone. In some other implementations, a cavity may be formed between the bottom surface 543 of the inner wall of the bottom housing 54 and the outer surface of the bottom housing 54. In this case, the hole 5431 extends from the bottom surface 543 of the inner wall of the bottom housing 54 to the cavity. A sound inlet hole 541 is further disposed on an outer surface part of the bottom housing 54 that is used to form the cavity. The sound inlet hole 541 extends from the outer surface of the bottom housing 54 to the cavity, so that a sound signal outside the headset enters the cavity and reaches the hole 5431 through the sound inlet hole 541, to be picked up by the microphone.

A protrusion 5441 may be disposed on the side surface 544, to play a role of support and positioning. Still refer to FIG. 11, FIG. 16(*a*), and FIG. 16(*b*). The bottom surface 543 in FIG. 16(*a*) and FIG. 16(*b*) is roughly planar. A waterproof and dustproof film 232 may be disposed on the bottom surface 543. A first FPC part 241 may be disposed on the protrusion 5441. Two surfaces of the waterproof and dustproof film 232 are coated with adhesive layers, one adhesive layer is adhered to the bottom surface 543, and the other adhesive layer is adhered to the first FPC part 241, so that both the first FPC part 241 and the waterproof and dustproof film 232 are fastened to the bottom housing 54.

According to the wireless headset provided in this embodiment of this application, the bottom housing and the charging electrode of the headset are integrated, and the bottom housing is used as the charging electrode. This omits a separate design of a charging contact in a cavity formed by the bottom housing, simplifies a structure design, reduces structure design complexity and process implementation complexity, and implements a plurality of functions by using one object. In addition, omitting the separate design of the charging contact can reduce arrangement of a contact on the flexible printed circuit, reduce space occupied by the charging contact, and increase space utilization. Still refer to FIG. 16(*a*) and FIG. 16(*b*). In the foregoing descriptions, an entity may exist or a cavity may be formed between the bottom surface 543 of the inner wall of the bottom housing 54 and the outer surface of the bottom housing 54. If only one sound inlet hole 54 communicating the outside of the headset with the microphone 231 is disposed, a problem of wind noise still exists in the design of the single sound inlet hole. In this embodiment of this application, the design of the single sound inlet hole on the bottom housing is changed to a structure design of a plurality of sound inlet holes, namely, a plurality of sound inlet holes 541 may be disposed, for example, two, three, four, or more. The plurality of sound inlet holes form a plurality of microphone sound inlet channels communicating with each other. With a structure design of the plurality of sound inlet holes and the plurality of microphone sound inlet channels communicating with each other, after a wind sound signal enters a structure sound inlet channel in the bottom housing of the headset, partial energy can be distributed through another hole, so that energy of wind sound acting on a diaphragm of the microphone can be reduced, to reduce wind noise picked up by the microphone, and reduce wind noise.

For example, a cavity may be formed between the bottom surface 543 of the inner wall of the bottom housing 54 and the outer surface of the bottom housing 54. In this case, the hole 5431 extends from the bottom surface 543 of the inner wall of the bottom housing 54 to the cavity. A plurality of sound inlet holes 541 are further disposed on an outer surface part of the bottom housing 54 that is used to form the cavity. The plurality of sound inlet holes 541 extend from the outer surface of the bottom housing 54 to the cavity, and the plurality of sound inlet holes 541 form microphone sound inlet channels communicating with each other, so that a sound signal outside the headset enters the cavity and reaches the hole 5431 through the plurality of sound inlet holes 541, to be picked up by the microphone. The plurality of sound inlet holes 541 may be dispersedly disposed (for example, evenly disposed) on the bottom housing 54. With the plurality of sound inlet holes 541, a voice signal in each direction can be picked up by the microphone, but wind sound signals that enter the cavity are distributed to weaken the wind sound signal picked up by the microphone.

In an implementation solution, the plurality of sound inlet holes 541 include two sound inlet holes opposite to each other, namely, two sound inlet holes in the plurality of sound inlet holes are opposite to each other. In other words, axes of the two sound inlet holes in the plurality of sound inlet holes 541 overlap. A reason is that wind generally has a direction. Therefore, when the axes of the two sound inlet holes overlap (or the two sound inlet holes are opposite to each other), the wind sound signal may be allowed to enter the cavity from one sound inlet hole in the two sound inlet holes and then flow out from the other sound inlet hole. This has a better attenuation effect on the wind sound signal. It should be understood that, in this embodiment of this application, a path on which a sound signal reaches the microphone through the sound inlet hole 541 may also be understood as a microphone sound inlet channel or a sound channel.

For another example, the part between the bottom surface 543 of the inner wall of the bottom housing 54 and the outer surface of the bottom housing 54 is an entity. In this case, the hole 5431 extends to the outside of the bottom housing 54 by using the entity part between the bottom surface 543 of the inner wall of the bottom housing 54 and the outer surface of the bottom housing 54, so that a plurality of sound channels (namely, microphone sound inlet channels) can be formed. The plurality of microphone sound inlet channels communicate with each other, to form a plurality of sound inlet holes 541 on the outer surface of the bottom housing 54. A sound signal may enter the headset through the microphone sound inlet channel between the sound inlet hole 541 and the hole 5431, to be picked up by the microphone. In other words, the sound signal may be transmitted from the outside of the bottom housing 54 to the hole 5431 through the plurality of microphone sound inlet channels. The plurality of microphone sound inlet channels may be divergent from the hole 5431, and the plurality of microphone sound inlet channels may cross with each other and communicate with the hole 5431 through a common sound inlet channel. The sound inlet holes 541 formed by the plurality of microphone sound inlet channels on the outer surface of the bottom housing 54 of the headset may be dispersedly disposed (for example, evenly disposed) on the outer surface of the bottom housing 54.

In an implementation solution, an included angle between center lines of two microphone sound inlet channels in the microphone sound inlet channels communicating with each other is 90° to 180°. In this way, the wind sound signal may enter the headset from one microphone sound inlet channel, and flow out from the other microphone sound inlet channel. This has a better attenuation effect on the wind sound signal.

In an implementation solution, the plurality of microphone sound inlet channels each may be in a shape of a straight line, an arc, a broken line, a curve, or a wavy line, or in another shape.

In an implementation solution, a cross section of each of the plurality of microphone sound inlet channels may be in at least one of the following shapes such as a circle, a rectangle, a trapezoid, a triangle, a rhombus, an oval, or a semicircle.

In an implementation solution, shapes of the plurality of microphone sound inlet channels may be the same, may be totally different, or may not be totally the same.

In an implementation solution, the plurality of microphone sound inlet channels include at least one pair of microphone sound inlet channels whose center lines overlap. In other words, at least one pair of microphone sound inlet channels in the plurality of microphone sound inlet channels communicates with each other, and central lines of the at least one pair of microphone sound inlet channels are on one straight line, or it is understood that the at least one pair of microphone sound inlet channels forms a sound channel in a shape of a straight line. A reason is that wind generally has a direction. Therefore, when at least one pair of microphone sound inlet channels communicates with each other and center lines of the at least one pair of microphone sound inlet channels are on one straight line, the wind sound signal can enter the headset from one microphone sound inlet channel in the pair of microphone sound inlet channels and then flow out from the other microphone sound inlet channel. This has a better attenuation effect on the wind sound signal. It should be understood that the at least one pair of microphone sound inlet channels may form a sound channel in another shape such as a shape of a broken line, an arc, or a wavy line. This is not limited in this embodiment of this application.

Figure 17:
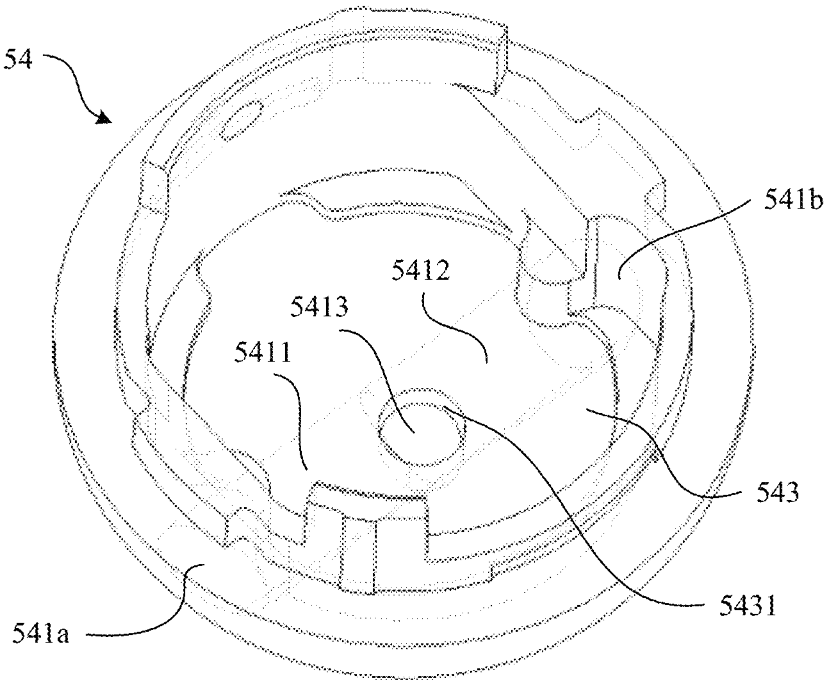
FIG. 17 is a schematic diagram of a structure of a bottom housing of a wireless headset according to an embodiment of this application.

FIG. 17 is a schematic diagram of a structure of a bottom housing of a wireless headset according to an embodiment of this application. In this embodiment of this application, an example in which the part between the outer surface of the bottom housing 54 and the bottom surface 543 of the inner wall is an entity is used. In this case, the sound signal enters the headset through the microphone sound inlet channel. FIG. 17 shows an example of two microphone sound inlet channels in the plurality of microphone sound inlet channels: a first sound inlet channel 5411 and a second sound inlet channel 5412. The first sound inlet channel 5411 and the second sound inlet channel 5412 communicate with each other. Axes of the first sound inlet channel 5411 and the second sound inlet channel 5412 may be on one straight line, that is, the first sound inlet channel 5411 and the second sound inlet channel 5412 form a sound channel in a shape of a straight line. The first sound inlet channel 5411 and the second sound inlet channel 5412 may communicate with a common sound inlet channel 5413. A sound inlet hole 541*a* is formed by the first sound inlet channel 5411 and the outer surface of the bottom housing 54, and a sound inlet hole 541*b* is formed by the second sound inlet channel 5412 and the outer surface of the bottom housing 54. The hole 5431 is formed by the common sound inlet channel 5413 and the bottom surface 543 of the inner wall of the bottom housing. The first sound inlet channel 5411 and the second sound inlet channel 5412 communicate with the microphone through the common sound inlet channel 5413.

Figure 18:
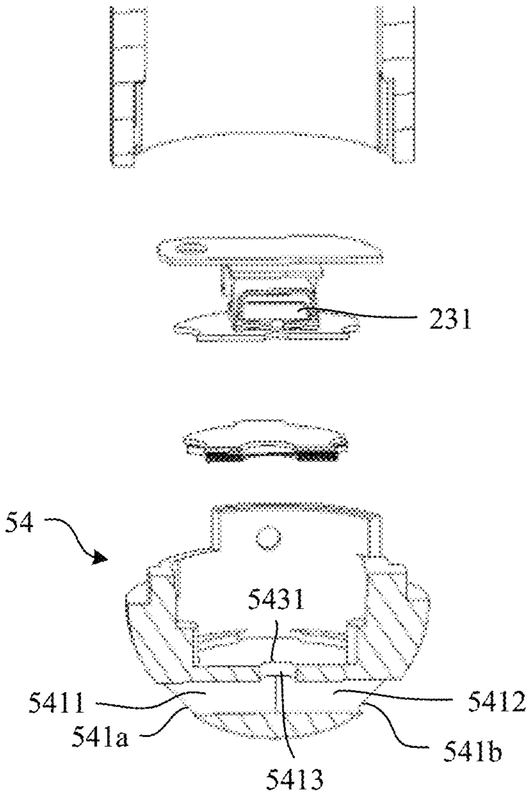
FIG. 18 is a schematic exploded view of a part of a wireless headset according to an embodiment of this application.
Figure 19:
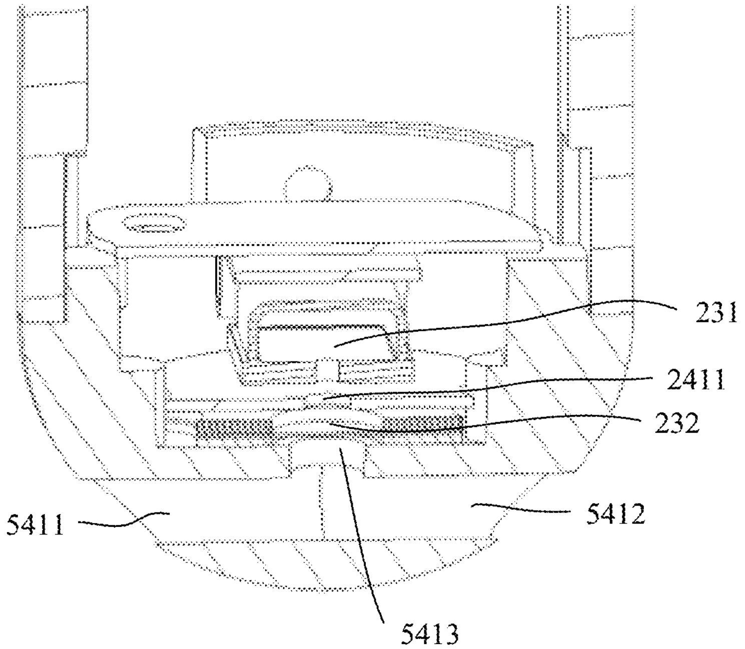
FIG. 19 is a schematic cross-sectional diagram of a part of a wireless headset according to an embodiment of this application.

FIG. 18 is schematic exploded view of a part of a wireless headset according to an embodiment of this application. FIG. 19 is schematic cross-sectional diagram of a part of a wireless headset according to an embodiment of this application. Refer to FIG. 18 and FIG. 19. In this embodiment of this application, a plurality of sound inlet holes are disposed on the bottom housing 54. In a call process, after the wind sound signal enters the microphone sound inlet channel, because the wind has a direction, the wind sound signal can enter the headset from one of the sound inlet holes and then flow out from the other sound inlet hole. Specifically, refer to FIG. 18 and FIG. 19. It is assumed that the wind sound signal enters the first sound inlet channel 5411 from the sound inlet hole 541*a*. The wind has a direction. Therefore, the wind sound signal can enter the second sound inlet channel 5412 from the first sound inlet channel 5411, and then flow out of the bottom housing 54 from the sound inlet hole 541*b*. After partial energy of wind sound is distributed through the second sound inlet channel 5412, energy of wind sound that enters the common sound inlet channel 5413 and acts on the microphone 231 is greatly reduced, to reduce wind noise picked up by the microphone 231. For a voice signal, because the voice signal may enter the bottom housing from each sound inlet hole, the voice signal may be normally picked up by the microphone. It should be understood that the common sound inlet channel 5413 in this embodiment of this application may be understood as a channel through which an external sound signal definitely passes when the signal is picked up by the microphone.

In this embodiment of this application, a wind noise reduction structure is designed on the bottom housing of the headset, and the wind sound signals are distributed and attenuated through a sound structure channel. This can reduce energy of the wind sound signal flowing into the diaphragm of the microphone at a speed of wind in each direction in an outdoor call environment, to reduce wind noise in a call process. Further, in this embodiment of this application, the bottom housing and the charging electrode of the headset are integrated, and the bottom housing of the headset is used as the charging electrode, so that a plurality of functions are implemented by using one object. Because space for arranging the charging contact is saved, space utilization of the cavity inside the headset can be increased. Therefore, the bottom housing of the headset in this embodiment of this application has a function of reducing wind noise, to suppress wind noise, reduce wind noise, and improve product call experience, and can also implement a charging function. This can simplify a structure design, reduce structure complexity, reduce a process difficulty, and increase space utilization.

The wireless headset provided in this embodiment of this application is generally equipped with an independent charging case, for example, the charging case 8 shown in FIG. 13 to FIG. 15. When the wireless headset needs to be charged, the wireless headset may be charged by placing the wireless headset inside the charging case. Specifically, after the wireless headset is placed inside the case, a Hall switch on the charging case is closed, Bluetooth is disconnected, and the wireless headset is in a low power consumption state. When the wireless headset is placed inside the charging case, the charging spring in the charging case is in contact with the bottom housing of the headset (when the bottom housing is used as one charging electrode, the metal connector pin in the charging case is further in contact with the other charging contact of the wireless headset), and the circuit is on. A chip disposed in the charging case has an internal voltage detection circuit. When it is detected that a voltage of the battery is less than a threshold, the charging case charges the battery of the headset. As the voltage of the charged battery of the headset gradually increases, a charging current gradually decreases. When it is detected that the voltage of the battery reaches a threshold or the charging current is less than a threshold, the chip is in a turn-off state, charging is stopped, and a charging process of the battery of the headset is completed.

In the descriptions of this application, it should be noted that, unless otherwise specified or limited, terms "mounting" and "connecting" shall be understood in a broad sense, for example, may be a fixed connection, a detachable connection, or an integrated connection, may be a mechanical connection or an electrical connection, may be a direct connection or an indirect connection by using an intermediate medium, or may be a connection inside two elements. A person of ordinary skill in the art may understand specific meanings of the foregoing terms in this application based on a specific situation.

The foregoing description is merely a specific implementation of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless headset, comprising:

a headset housing; and a headset assembly accommodated in the headset housing, wherein the headset assembly comprises a microphone;

wherein the headset housing comprises a bottom housing, the bottom housing comprises a first bottom housing part and a second bottom housing part that are separated by using an insulating material, the first bottom housing part is a positive charging electrode, and the second bottom housing part is a negative charging electrode; and wherein a plurality of sound inlet holes are disposed on the bottom housing, and form microphone sound inlet channels communicating with each other.

2. The wireless headset according to claim 1, wherein the plurality of sound inlet holes are evenly disposed on the bottom housing.

3. The wireless headset according to claim 1, wherein the plurality of sound inlet holes are disposed on the insulating material.

4. The wireless headset according to claim 1, wherein the plurality of sound inlet holes comprise two sound inlet holes, and axes of the two sound inlet holes overlap.

5. The wireless headset according to claim 1, wherein a cross section of the microphone sound inlet channel is in at least one shape from the group consisting of:

a circle, an oval, a polygon, and a wave shape.

6. The wireless headset according to claim 1, wherein the microphone sound inlet channels comprise a first sound inlet channel and a second sound inlet channel that communicate with each other, and the first sound inlet channel and the second sound inlet channel communicate with the microphone through a common sound inlet channel.

7. The wireless headset according to claim 1, wherein an outer wall of the bottom housing is arc-shaped.

8. The wireless headset according to claim 1, wherein the headset assembly further comprises a flexible printed circuit and a battery electrically connected to the flexible printed circuit, and the first bottom housing part and the second bottom housing part each are electrically connected to the flexible printed circuit.

9. The wireless headset according to claim 8, wherein a first bending part is disposed on an end of the flexible printed circuit close to the bottom housing, and the microphone is disposed on the first bending part, and is electrically connected to the flexible printed circuit.

10. The wireless headset according to claim 8, wherein a second bending part is disposed on an in-ear end of the flexible printed circuit in the headset housing, and a speaker is disposed on the second bending part.

11. A wireless headset, comprising:

a headset housing; and a headset assembly accommodated in the headset housing;

wherein the headset assembly comprises a microphone;

wherein the headset housing comprises a bottom housing, the bottom housing is one of a positive charging electrode and a negative charging electrode, and the other of the positive charging electrode and the negative charging electrode is separated from the bottom housing; and wherein a plurality of sound inlet holes are disposed on the bottom housing, and form microphone sound inlet channels communicating with each other.

12. The wireless headset according to claim 11, wherein the headset housing comprises a front housing, a rear housing, and a headset handle, the front housing is connected to the rear housing, the rear housing extends downward to form the headset handle, the bottom housing is located at an end of the headset handle, and the other of the positive charging electrode and the negative charging electrode is disposed on the rear housing.

13. The wireless headset according to claim 11, wherein the plurality of sound inlet holes are evenly disposed on the bottom housing.

14. The wireless headset according to claim 11, wherein the plurality of sound inlet holes comprise two sound inlet holes, and axes of the two sound inlet holes overlap.

15. The wireless headset according to claim 11, wherein a cross section of the microphone sound inlet channel is in at least one shape from the group consisting of:

a circle, an oval, a polygon, and a wave shape.

16. The wireless headset according to claim 11, wherein the microphone sound inlet channels comprise a first sound inlet channel and a second sound inlet channel that communicate with each other, and the first sound inlet channel and the second sound inlet channel communicate with the microphone through a common sound inlet channel.

17. The wireless headset according to claim 11, wherein an outer wall of the bottom housing is arc-shaped.

18. The wireless headset according to claim 11, wherein the headset assembly further comprises a flexible printed circuit and a battery electrically connected to the flexible printed circuit, one end of the flexible printed circuit is electrically connected to the bottom housing, and the other end of the flexible printed circuit is electrically connected to the other of the positive charging electrode and the negative charging electrode.

19. The wireless headset according to claim 18, wherein a first bending part is disposed on an end of the flexible printed circuit close to the bottom housing, and the microphone is disposed on the first bending part, and is electrically connected to the flexible printed circuit.

20. The wireless headset according to claim 18, wherein a second bending part is disposed on an in-ear end of the flexible printed circuit in the headset housing, and a speaker is disposed on the second bending part.

* * * * *